United States Patent [19]

Nakamura et al.

[11] Patent Number: 6,061,496
[45] Date of Patent: *May 9, 2000

[54] SYSTEM FOR RECORDING AND REPRODUCING KARAOKE DATA

[75] Inventors: Junichi Nakamura, Chiba; Kenji Tomizawa, Kanagawa; Yoshihiro Machiguchi, Tokyo, all of Japan

[73] Assignee: Sony Corporation, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/834,099

[22] Filed: Apr. 14, 1997

Related U.S. Application Data

[63] Continuation of application No. 08/417,120, Apr. 5, 1995, abandoned.

[30] Foreign Application Priority Data

| Apr. 6, 1994 | [JP] | Japan | 6-093145 |
| Aug. 29, 1994 | [JP] | Japan | 6-226039 |
| Aug. 29, 1994 | [JP] | Japan | 6-226040 |

[51] Int. Cl.$^7$ ............................. H04N 5/781; H04N 5/928
[52] U.S. Cl. ............................. 386/98; 386/105; 386/106; 386/125; 434/307 A
[58] Field of Search ........................... 386/1, 39, 95–107, 386/111–112, 125–126; 434/307 A; 360/72.7; 369/70, 59, 63; H04N 5/76, 5/781, 9/79, 5/928, 5/92

[56] References Cited

U.S. PATENT DOCUMENTS

| 5,131,311 | 7/1992 | Murakami et al. | 386/96 |
| 5,245,600 | 9/1993 | Yamauchi et al. | 386/126 |
| 5,247,126 | 9/1993 | Okamura et al. | 84/609 |
| 5,455,684 | 10/1995 | Fujinami et al. | 386/112 |

FOREIGN PATENT DOCUMENTS

| 0 587 416 | 3/1994 | European Pat. Off. . |

OTHER PUBLICATIONS

M. Matusak: "Full Motion Video System. Video von der CD." Funkschau, vol. 65, No. 18, Aug. 1993, pp. 120–125, XP000393101 Munchen DE.

J. Van Der Meer: "The Full Motion System for CD-1." IEEE Transaction on Consumer, Electronics, vol. 38, No. 4 pp. 910–920, XP000324653 New York US.

C. Herpel et al.: "Video Coding for Recording on a CD–like Magneto–Optical Disc." IEEE 1990 International Conference on Consumer Electronics. Digest of Technical Papers. ICCE., 6–8 Jun. 1990, pp. 46–47, XP000169759 Rosemont, Ill (US).

*Primary Examiner*—Thai Tran
*Attorney, Agent, or Firm*—Frommer Lawrence & Haug, LLP.; William S. Frommer

[57] ABSTRACT

A method of reproducing a recording medium on which image data is recorded using an MPEG (Moving Picture Coding Expert Group) or the like, the image data including first image data where all image information for one frame of question is compressed and second image data where information on a change in image information for frames before and after the frame of question is compressed, is characterized in that, when a predetermined portion in the image data recorded on the recording medium is reproduced, reproduction is started from a portion on the recording medium where the first image data is recorded.

14 Claims, 19 Drawing Sheets

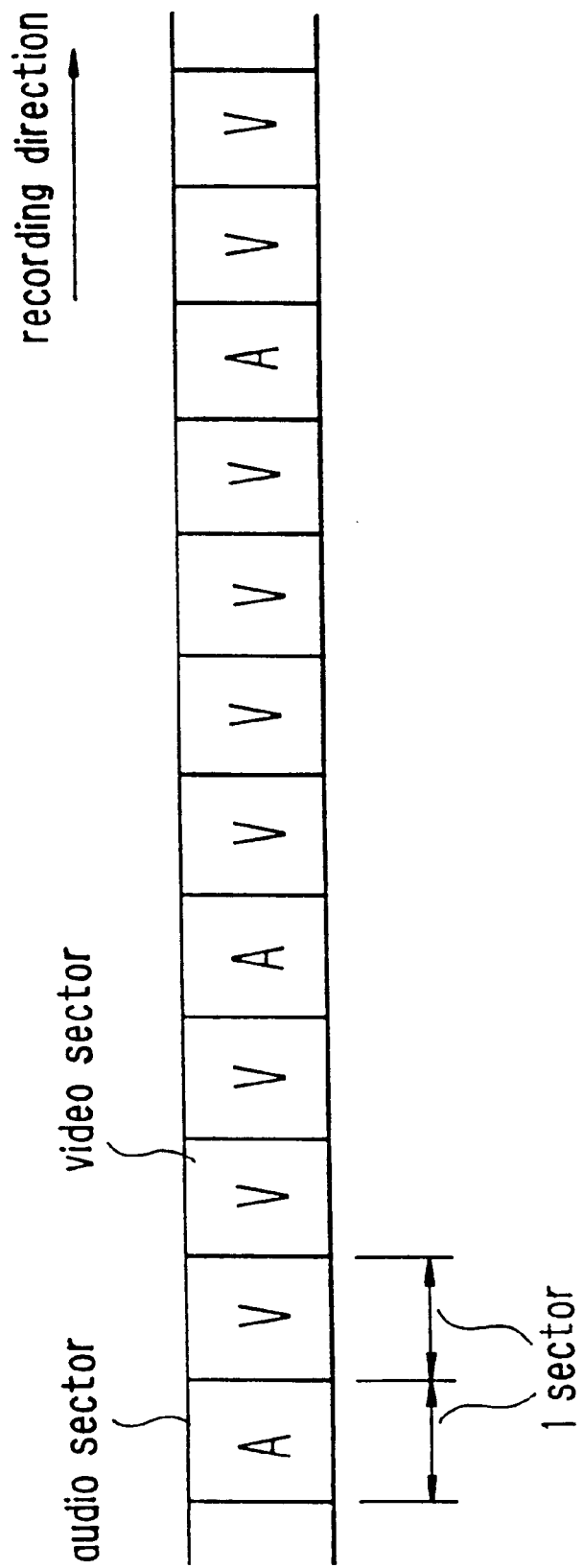

FIG.2

| physical format | CD-ROM(XA) |
|---|---|
| digital video | MPEG1 basis<br>pixel dimensions (pixel number)/frame frequency<br>    352×240/29.97Hz(NTSC)<br>    352×240/23.976Hz (film)<br>    352×288/25Hz(PAL)<br>data transfer speed :<br>    1.152Mbits/second at maximum |
| digital audio | MPEG1 layer 2<br>sampling frequency : 44.1KHz<br>data transfer speed : 224Kbits/second (on and after track 2)<br>64, 96, 128, 192, 224, 384Kbit/second (track 1) |
| reproducing period | 74 minutes at maximum |
| pixel number in still pictue | standard level : 352 × 240(NTSC)<br>    352 × 288(PAL)<br>high definition level : 704 × 480(NTSC)<br>    704 × 576(PAL) |
| reproduction mode | normal play, slow, pause, etc.<br>·menu reproduction by using playback control |
| video signal output | |
| applised field | movie, karaoke, music, education, photo album, etc. |

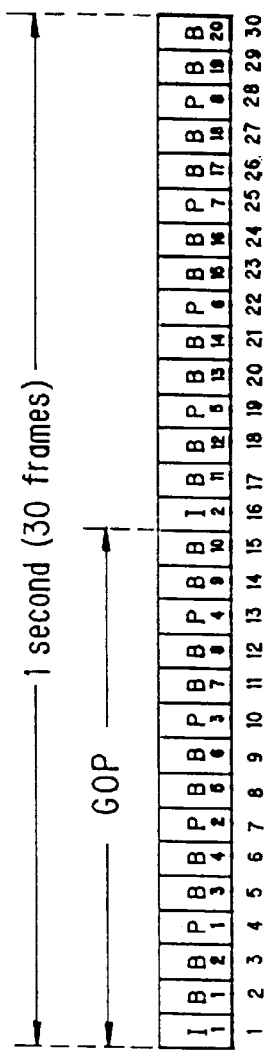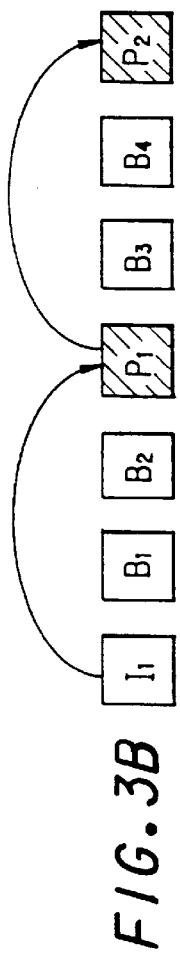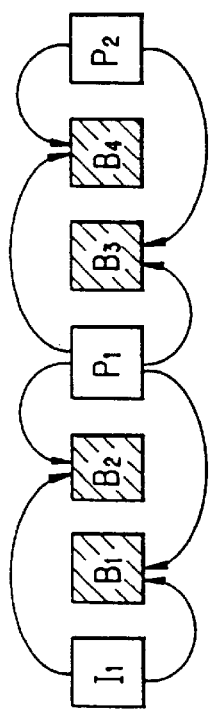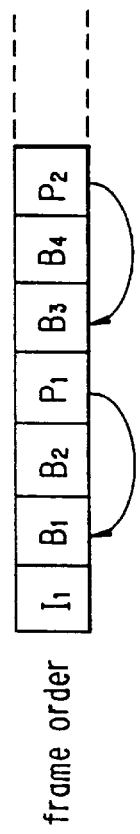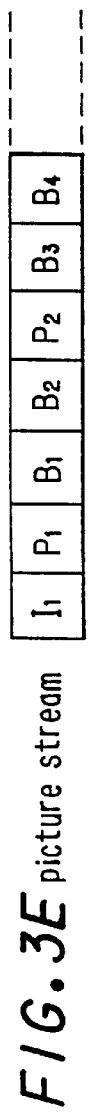
FIG. 3A
FIG. 3B
FIG. 3C
FIG. 3D frame order
FIG. 3E picture stream FIG. 10A
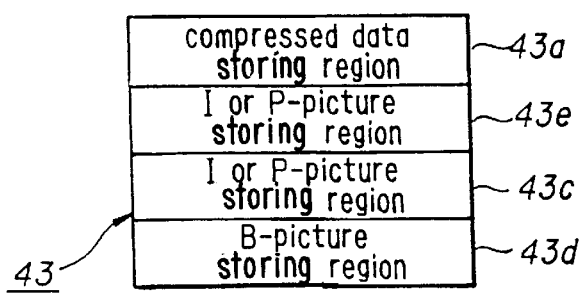
FIG. 10B
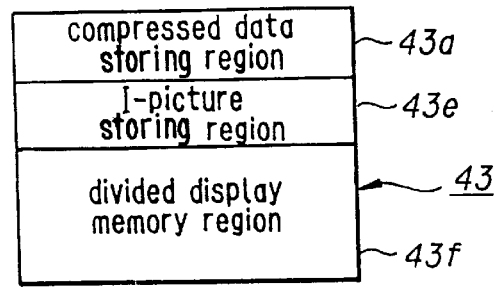
FIG. 11
| $G_1$ | $G_2$ | $G_3$ |
|---|---|---|
| $G_4$ | $G_5$ | $G_6$ |
| $G_7$ | $G_8$ | $G_9$ |

FIG. 12A
FIG. 12B
FIG. 12C
FIG. 12D
FIG. 12E
FIG. 12F
FIG. 12G
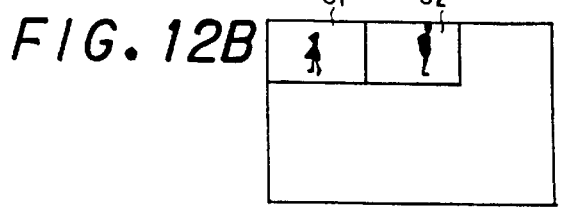
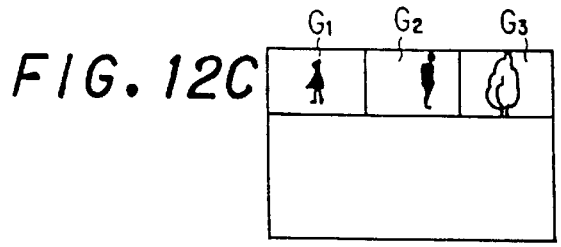
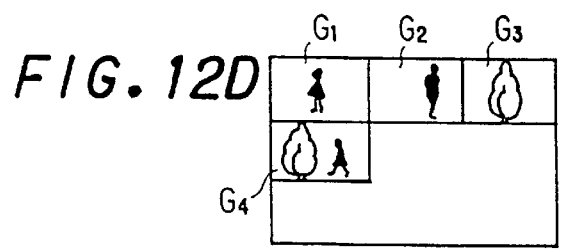
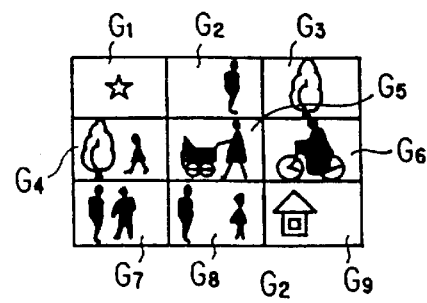
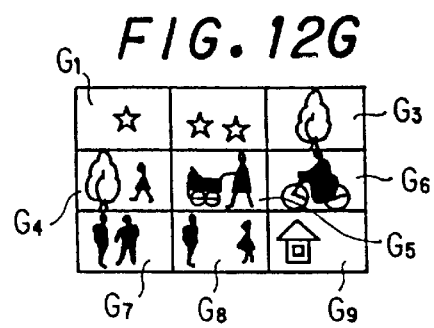
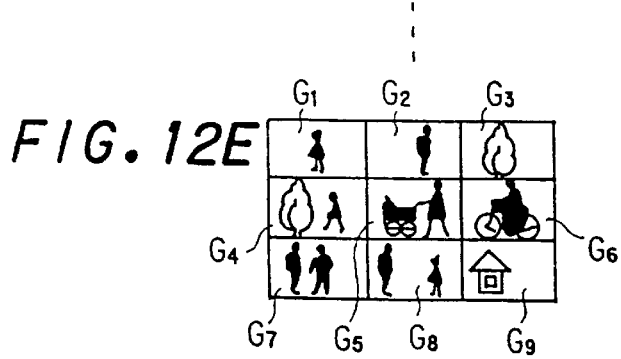

FIG. 16

| G₁ | G₂ |
|---|---|
| G₃ | G₄ |

FIG. 17

| G₁ | G₂ | G₃ | G₄ |
|---|---|---|---|
| G₅ | G₆ | G₇ | G₈ |
| G₉ | G₁₀ | G₁₁ | G₁₂ |
| G₁₃ | G₁₄ | G₁₅ | G₁₆ |

FIG. 18

| G₁ | G₂ | G₃ |
|---|---|---|
| G₈ | ///// | G₄ |
| G₇ | G₆ | G₅ |

FIG. 20

|  | item No. | contents |
|---|---|---|
| — | 0 ~ 7 | (disk item) |
| necessary | 8 | tune ISRC code |
| necessary | 9 | tune name |
| arbitrary | 10 | tune name (for rearrangement) |
| necessary | 11 | performer name |
| arbitrary | 12 | performer name (for rearrangement) |
| necessary | 13 | writer name |
| necessary | 14 | composer name |
| arbitrary | 15 | arranger name |
| arbitrary | 16 | original performer name |
| arbitrary | 17 | text header |
| arbitrary | 18 | text |
| arbitrary | 19 | musical interval of karaoke |
| arbitrary | 20 | musical interval of original tune |
| arbitrary | 21 | details of tune contents |
| arbitrary | 22 ~ 31 | maker defining item |
| arbitrary | 32 ~ 63 | reserve area |

SITi sequence item table

| | code | contents |
|---|---|---|
| EH | 60(H) | impressive point |
| | 61(H)~61(H) | n-chorus point |
| EL | 30(H) | end (off) |
| | 31(H) | fade out (A+V) |
| | 32(H) | fade out (A) |
| | 33(H) | fade out (V) |
| | 38(H) | start (on) |
| | 39(H) | fade in (A+V) |
| | 3A(H) | fade in (A) |
| | 3B(H) | fade in (V) |

SYSTEM FOR RECORDING AND REPRODUCING KARAOKE DATA

This application is a continuation of application Ser. No. 08/417,120, filed Apr. 5, 1995, now abandoned.

BACKGROUND

1. Field of the Invention

The present invention relates to a method of reproducing a recording medium and an apparatus for reproducing the same. More particularly, the present invention relates to a method of reproducing a recording medium by compressing moving picture information, and an apparatus therefor.

2. Background of the Invention

There has been known one of the CD-ROM (CD-Read Only Memory) standards, which is called a video-CD. The video-CD in which audio information as well as moving picture information has been recorded has been put to practical use as a recording medium for a so-called "Karaokeu"

In the video-CD, a moving picture signal as well as an audio signal has been compressed and encoded in conformity with the MPEG (Moving Picture Coding Expert Group) standards before being recorded.

In other words, the audio signal and moving picture signal are recorded in the following manner. The audio signal is converted into a digital signal, and then compressed by the compression coding system utilizing an audition psychology characteristic before being recorded. The moving picture signal is converted into a digital signal, and one screen is blocked in a plurality of blocks. Each of the blocks is subjected to discrete cosine transformation (DCT) so that the coding quantity is decreased in accordance with the degree of a change of an image. Codes of short lengths are allocated to the codes which have been subjected to the DCT in accordance with a VLC (Variable Length Code), as they are higher in the frequency of occurrence, so that the coding quantity are reduced as a whole.

In the case of moving picture data, a difference between an actual screen and a screen a change of which is predicted from a past screen and future screen is extracted. Then, the difference thus extracted and the predicted quantity of change are recorded, and the data quantity is also compressed. However, since a demodulated picture cannot be obtained from only data for the difference and the predicted quantity of change, picture data for one screen (1 frame) which is a reference to the data for the difference and the predicted quantity of change is compressed and encoded as it is, without referring to other pictures. In this manner, the reference picture thus compressed and encoded without referring to other pictures is called an "I-picture" (Intra Picture). Other pictures which contain change information for the I-picture is called a "P-picture" (Predicted Picture) or a "B-picture" (Bi-directional Prediction Picture).

The audio signal and moving picture signal are recorded, as shown in FIG. 1, on a disc by a sector unit established by the CD-ROM standards. In other words, in FIG. 1, Symbol V designates a sector (hereinafter referred to a "video sector") of moving picture data which has been compressed and encoded, and A designates a sector (hereinafter referred to an "audio sector") of audio data which has been compressed and encoded. Since the audio data is less than the moving picture data in the quantity of data, it is recorded in the ratio of one audio sector to a plurality of video sectors, as shown in FIG. 1.

As will be described in more detail later, information on a distinction between the audio sector and the video sector, information on an absolute time on a disc, and information on a time when a moving picture or sound is outputted at the time of reproducing (information on a correspondence in a reproducing timing between the moving picture and sound) are recorded on the respective sectors. The reproducing apparatus reproduces each music and a moving picture associated with that music on the basis of those information.

As is apparent from the above description of the compression encoding system for moving picture data, an accurate demodulated picture cannot be obtained without the I-picture. For this reason, when reproduction is started from the halfway position of a certain track (one track corresponds to one music; hereinafter, a sequence of events such as one music will be called one (1) sequence), it is difficult to obtain a accurate reproduced image unless the position of the I-picture is known.

In the format of the video-CD, in order to maintain a given image quality, the I-pictures are arranged in such a manner that one I-picture is necessarily recorded within 2 seconds. However, in the format of the original video-CD (hereinafter referred to as an "old video-CD format"), no information on the position of the I-picture is recorded on a disc. For this reason, the old video-CD format did not facilitate the start of reproduction from the halfway position of a certain track.

Thereafter, in the format of a revised video-CD format (hereinafter, referred to as a "new video-CD format"), a halfway position on a track where an image can be reproduced (hereinafter referred to as an "entry point"), after being converted into time information, is recorded on an area (a first track 1 as will be described later) where information on the number of music on the disc and recording data on the disc is recorded. The entry point is directed to information on the position of the I-picture and enables a picture to be reproduced even at the time of partially reproducing or forward feed reproducing by reproducing while referring to that point.

In the video-CD, data which has been subjected to a compression processing is recorded as the moving picture signal. That data contains I-picture data which enables one screen to be reproduced by decoding the compression-processed data independently because the data has been subjected to compressing and encoding within one screen as described above, P-picture data which cannot be decoded without use of the I-picture, and B-picture data which cannot be decoded without use of the I-picture data and the P-picture data.

In the normal reproduction, those I-, P- and B-pictures are decoded, respectively, to output the reproduction of the moving picture. In the high-speed reproduction such as FF (fast forward) or REW (rewind), the I-picture data may be extracted discretely from the disc and then displayed.

In the high-speed reproduction, as the practical operation, the I-picture data is searched through the reproducing operation, and then decoded so that the decoded data is continuously outputted to be displayed as it looks like a still picture. Thereafter, a track jump is executed so that an I-picture is searched by executing the reproducing operation again from a jump completion point. Then, after the decoding processing is completed, the present screen is switched to a previous screen so that a picture of the I-picture decoded at this time is outputted to be displayed, and a track jump is executed. The above operation is repeated.

However, in the case where no I-picture could be found at the time of the reproducing operation, the picture of the previous I-picture is caused to be displayed for a long period of time.

For example, because the I-picture cannot be found in the duration where an optical head is scanning between two music on the disc, a picture which has previously been decoded and outputted to be displayed is continuously being displayed. Therefore, the operation is not changed to the high-speed reproducing operation.

Also, if the I-picture is decoded and display is switched immediately when the I-picture has been found, the duration from the start of displaying a certain picture to the start of displaying a next picture, that is, the length of a period of time during which each picture is displayed is dispersed. The shortened or lengthened period of time for displaying each picture makes its visibility very poor as a high-speed reproduced picture.

The above difficulties result in such problems that the visibility of a search screen as well as the usability are lowered.

Moreover, a Karaoke system has been realized which uses a video-CD conforming to the old video-CD format as a recording medium. However, in Japan, in recent years, music programs are reduced from TV programs whereby the entire music is difficult to memorize. Also, the Karaoke houses in which Karaoke systems are installed are increased. The account of loyalty to copyrights is shifted from a music unit system to a time charge system. Thus, the environments surrounding a Karaoke market are changed as a result of which the market has made the following demands for the Karaoke systems.

That is,
1) A user wishes to sing only the characteristic portions of music which is a so-called "impressive" ("Sabi" in Japanese).
2) The user wishes to sing only the first or second part of a poem or to finish with singing of the second part.
3) The user wishes to forwardly feed parts of music irrelevant to singing such as an interlude or a weak phrase for omission.

However, in the reproducing apparatus having the video-CD as a recording medium such as the conventional Karaoke system, there is no means for knowing the position of a specified partial sequence. For this reason, the user is required to search the start and end points of the partial sequence to manipulate the reproducing apparatus so as to realize the specified partial reproduction or omission described in the above items 1) to 3). This is troublesome. In particular, in the case of limiting the position of the partial sequence depending on music, for example, in the case of reproducing only the portion of "Sabi" (impressive), the operator must manipulate the reproducing apparatus at not only the start position of the partial sequence but also the end position of the partial sequence. Thus, the manipulation is troublesome.

As described above, in the old video-CD format, information on the position of the I-picture is not recorded on a disc. For this reason, when starting reproduction from the middle of certain music as in the above items 1) to 3), a moving picture associated with such a situation is difficult to reproduce.

In the new video-CD format, since the position of the I-picture is known as an entry point, the moving picture can be reproduced even from the middle of music. However, in the case of starting reproduction from a specified portion of music as in the above items 1) to 3), it can be specified from which entry point reproduction should be preferably started.

SUMMARY OF THE INVENTION

It is therefore an object of the present invention to provide a method of reproducing a recording medium which resolves the above-mentioned problems.

It is another object of the present invention to provide an apparatus for reproducing a recording medium which resolves the above-mentioned problems.

According to the present invention, there is provided a method of reproducing the recording medium on which picture data including first picture data where all of picture information for one frame is compressed and second picture data where information on a change of picture information for frames positioned before and after the frame of question is compressed, and audio data which is compressed are recorded. The method of reproducing the recording medium is characterized in that reproduction is executed from a portion of the recording medium where the first picture data is recorded when reproducing a given portion of picture data recorded on the recording medium.

Also, according to the present invention, there is provided a method of reproducing the recording medium on which picture data associated with audio data and including at least one audio data, first picture data where all of picture information for one frame is compressed, and second picture data where information on a change of picture information for frames positioned before and after the frame of question is compressed are recorded. The method of reproducing the recording medium is characterized in that, in reproducing the audio data and picture data which are recorded on the recording medium by accessing to a predetermined position of the recording medium, the reproduction of audio data is started from an accessed position, and the picture data is reproduced from a portion of the picture data where the first picture data is recorded in the vicinity of the accessed position.

Further, according to the present invention, there is also provided a method of reproducing a recording medium on which at least one audio data, picture data associated with the audio data and including first picture data where all of picture information for one frame is compressed, and second picture data where information on a change of picture information for frames positioned before and after the frame of question is compressed, and position data representing a position where the first picture data is recorded are recorded. The method of reproducing the recording medium is characterized in that, in reproducing the audio data and picture data which are recorded on the recording medium by accessing to a predetermined position of the recording medium, the reproduction of audio data is started from an accessed position, and the picture data is reproduced from a portion of the picture data where the first picture data is recorded on the basis of the position data.

Still Further, according to the present invention, there is provided an apparatus for reproducing a recording medium on which image data including first picture data where all of picture information for one frame is compressed, and second picture data where information on a change of picture information for frames positioned before and after the frame of question is compressed is recorded. The apparatus for reproducing the recording medium includes a reader, a decoder and a controller. The reader reads data recorded on the recording medium. The decoder subjects data outputted from the reader to a decoding processing. The controller controls the reader and the decoder. In reproducing a predetermined portion of picture data recorded on the recording medium, the controller controls the movement of the reader to make the reader gain access to a position on the recording medium where the first picture date is recorded, thereby reproducing picture data from the position of the recording medium where the first picture date is recorded.

Yet still further, according to the present invention, there is provided an apparatus for reproducing a recording medium on which at least one audio data, picture data that is associated with the audio data and includes first picture data where all of picture information for one frame is compressed, and second picture data where information on a change of picture information for frames positioned before and after the frame of question is compressed, and position data representing a position where the first picture data is recorded are recorded. The reproducing apparatus includes a reader, a decoder and a controller. The reader reads data recorded on the recording medium, and the decoder subjects data outputted from the reader to a decoding processing. The controller controls the reader and the decoder. In reproducing audio data as well as picture data which are recorded on the recording medium by making the reader gain access to a predetermined position of the recording medium, the controller controls the decoder so that the reproduction of audio data is started from the accessed position of the reader. Also, the controller controls the reader as well as the decoder so that the picture data read by the reader is reproduced from a portion of the recording medium where the first picture date is recorded on the basis of the position data.

According to the present invention, in starting the reproduction of data compressed and recorded on the recording medium, the picture data for one frame among picture data is reproduced from the first picture data compressed so that accurate moving picture can be reproduced at all times.

The above and other objects and features of the present invention will be more apparent from the following description taken in conjunction with the accompanying drawings.

BRIEF DESCRIPTION OF THE DESCRIPTION

FIG. 1 is an explanatory diagram showing the recording state of audio data and video data in a video-CD;

FIG. 2 is an explanatory diagram showing a CD-ROM format;

Figure 4:
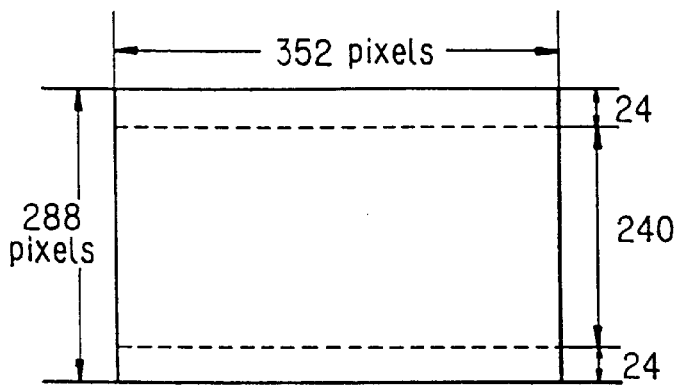
Figure 5A:
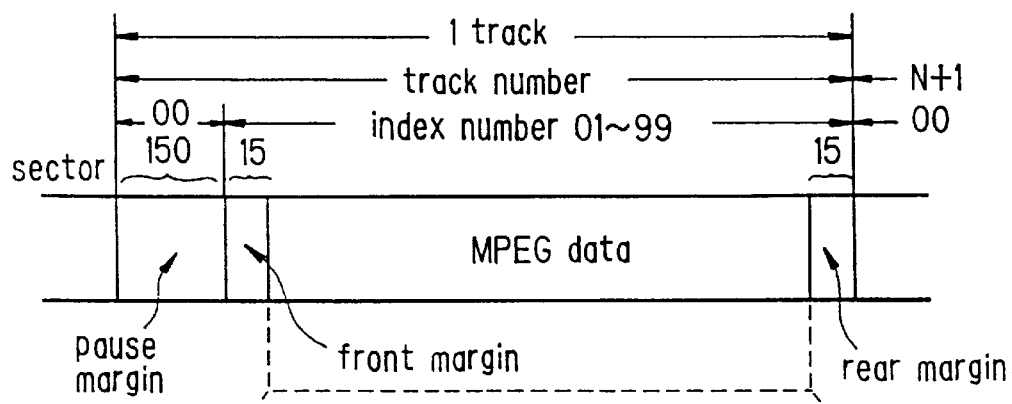
Figure 5B:
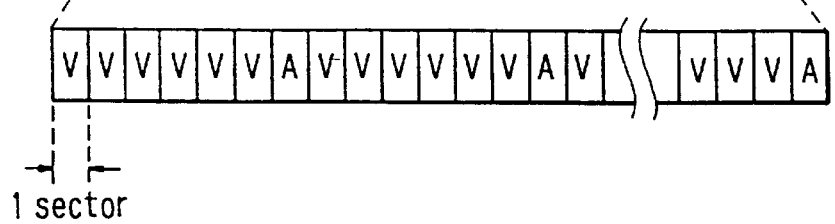
Figure 6:
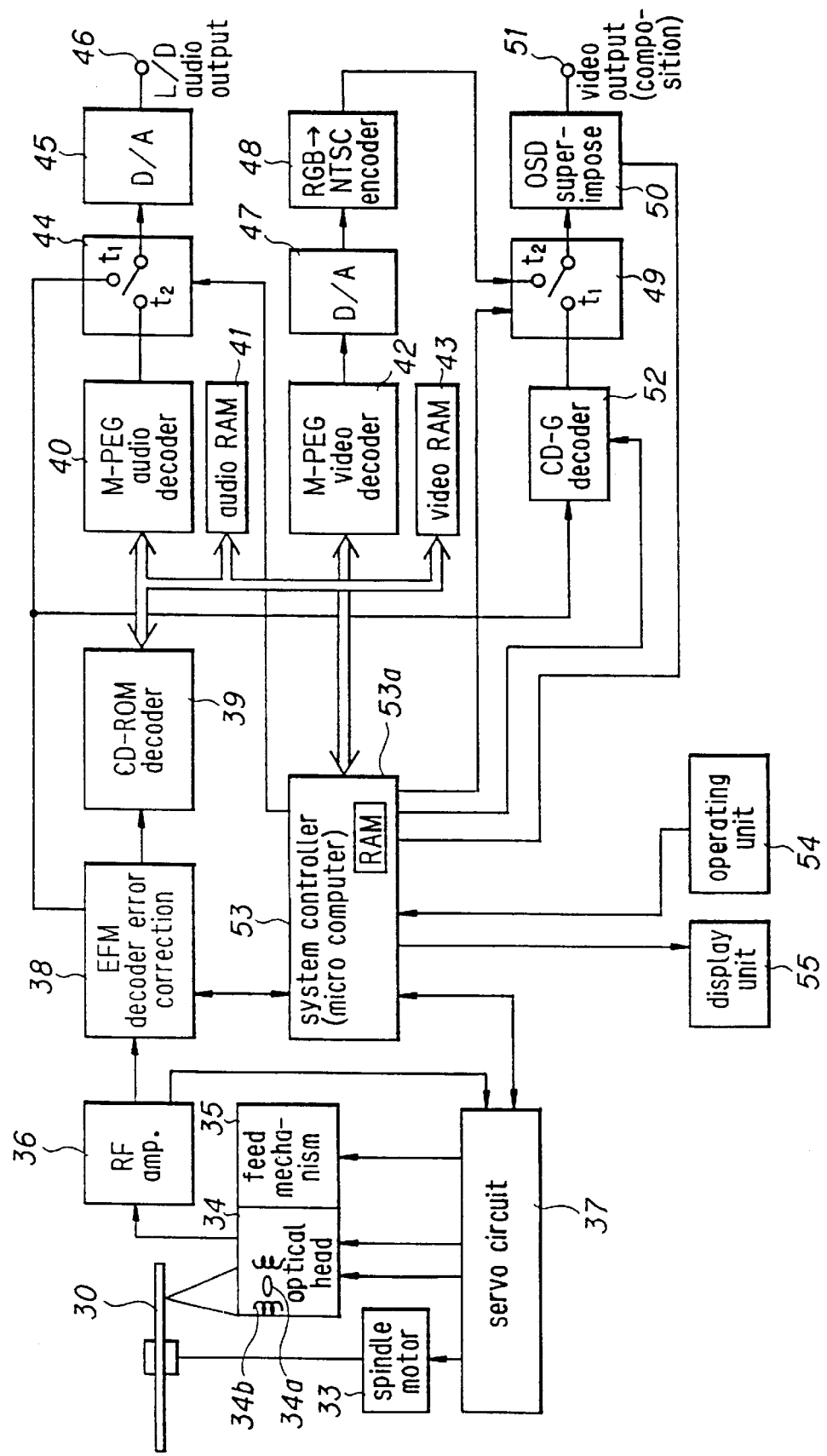
Figure 7:
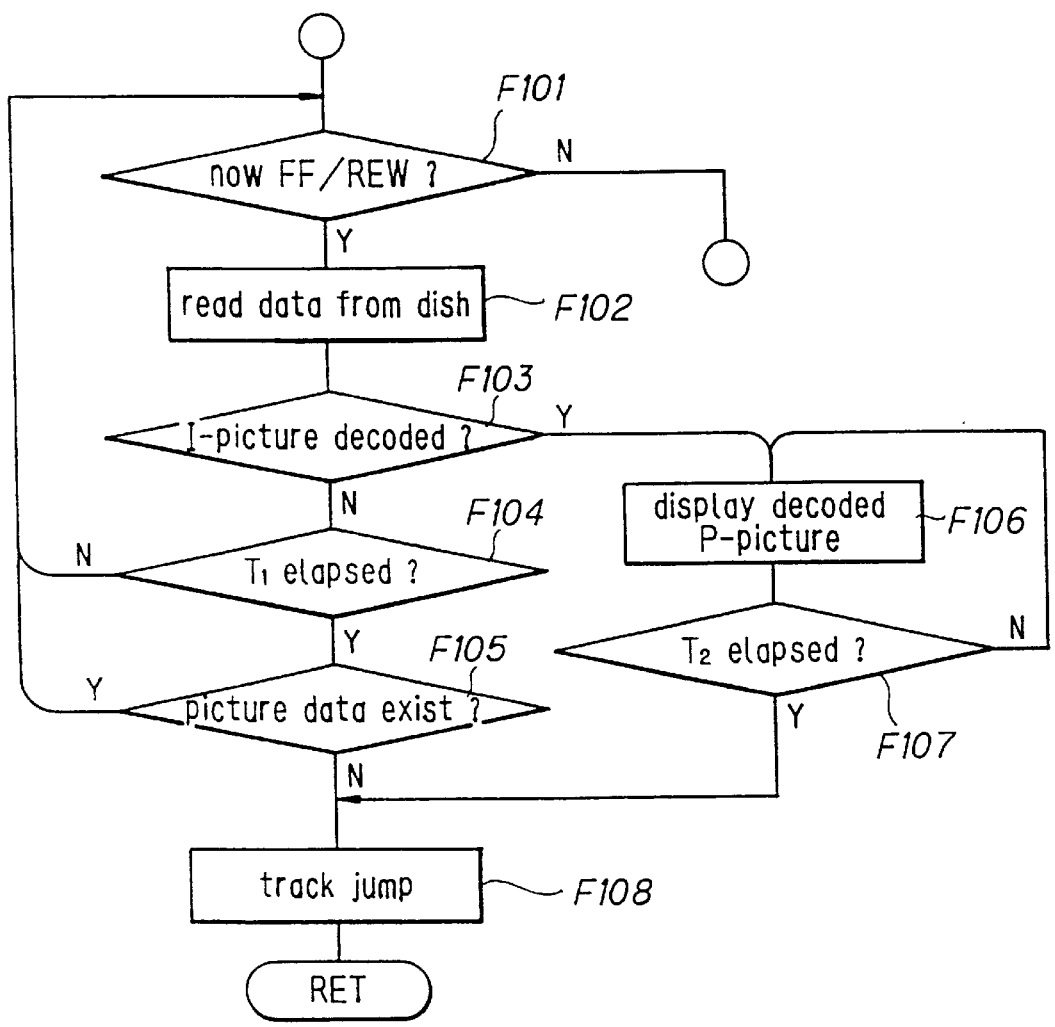
Figure 8:
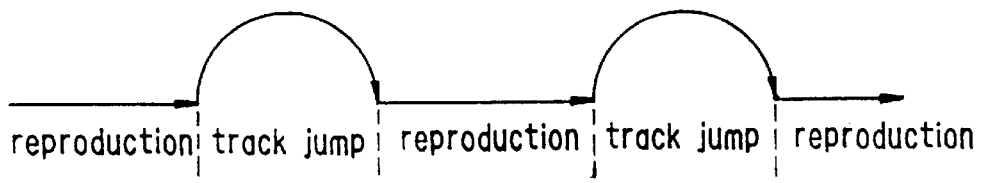
Figure 9:
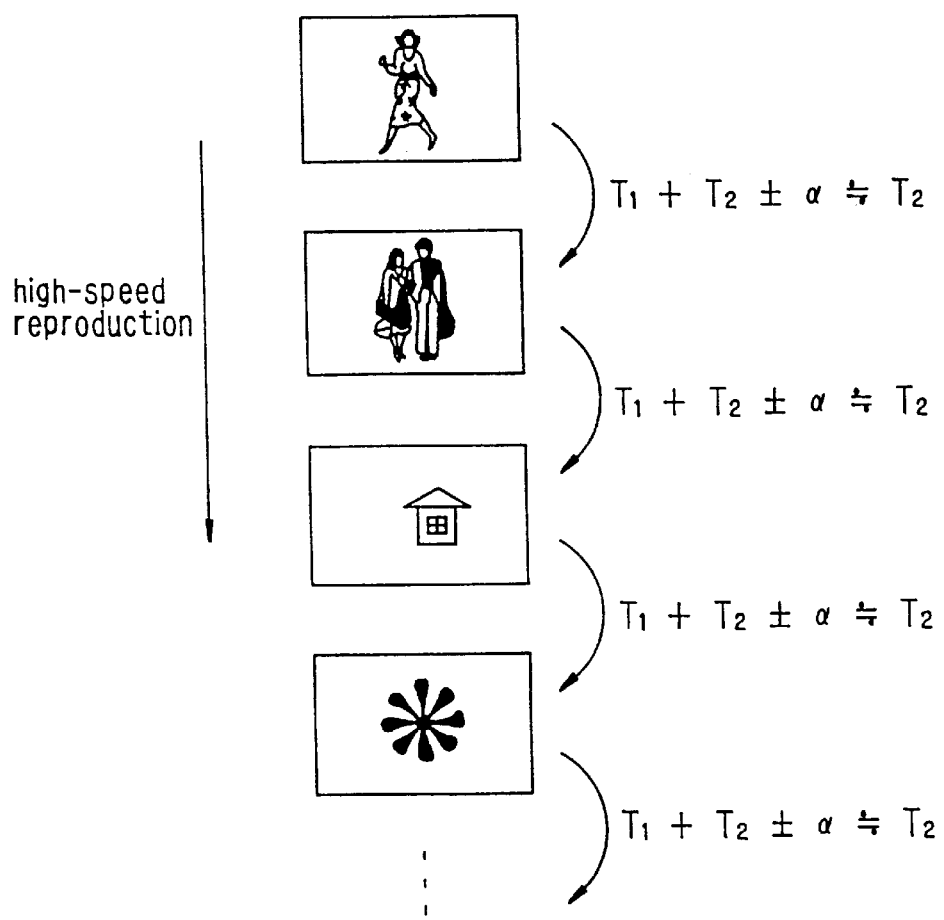
Figure 13:
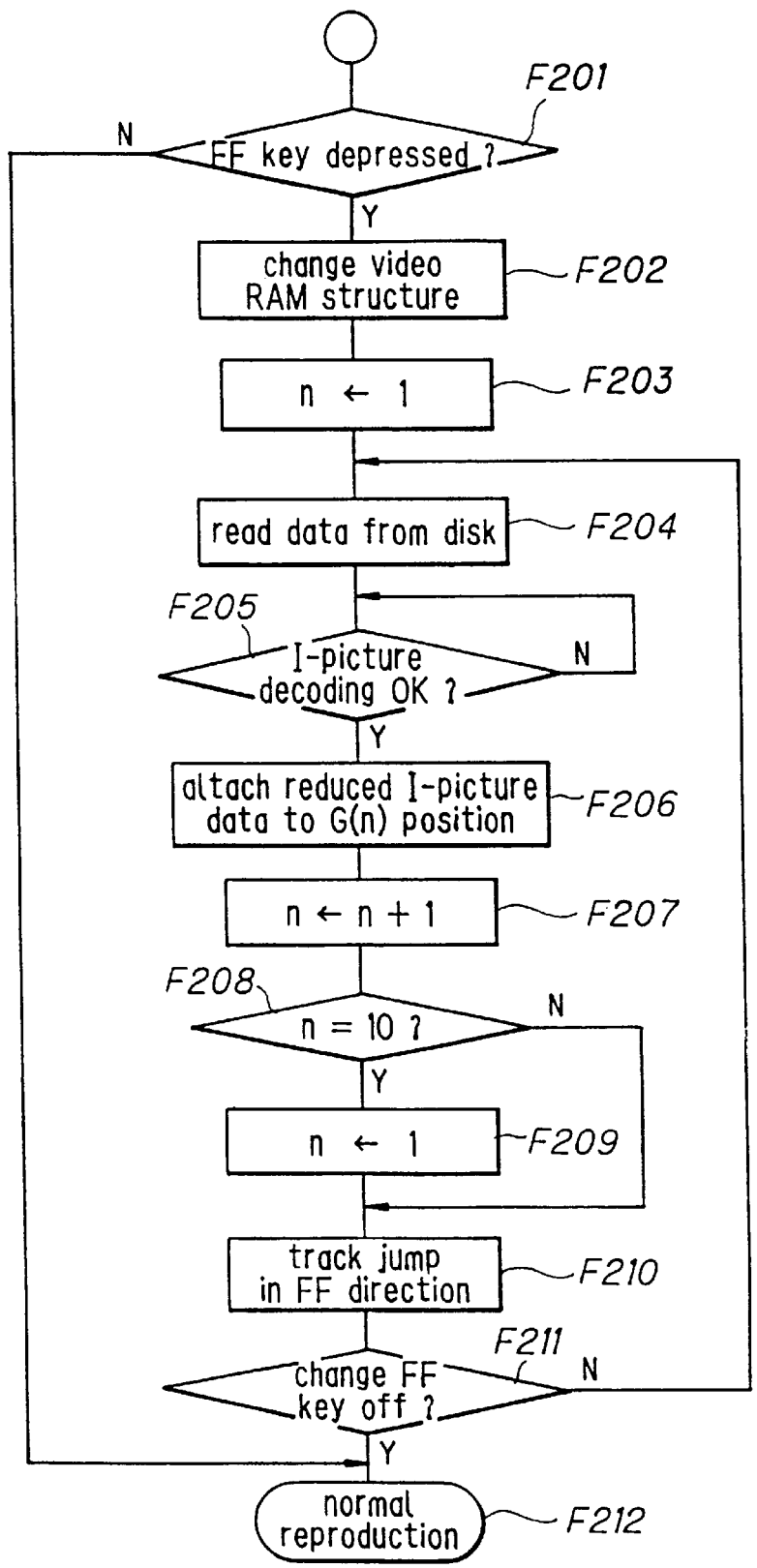
Figure 15:
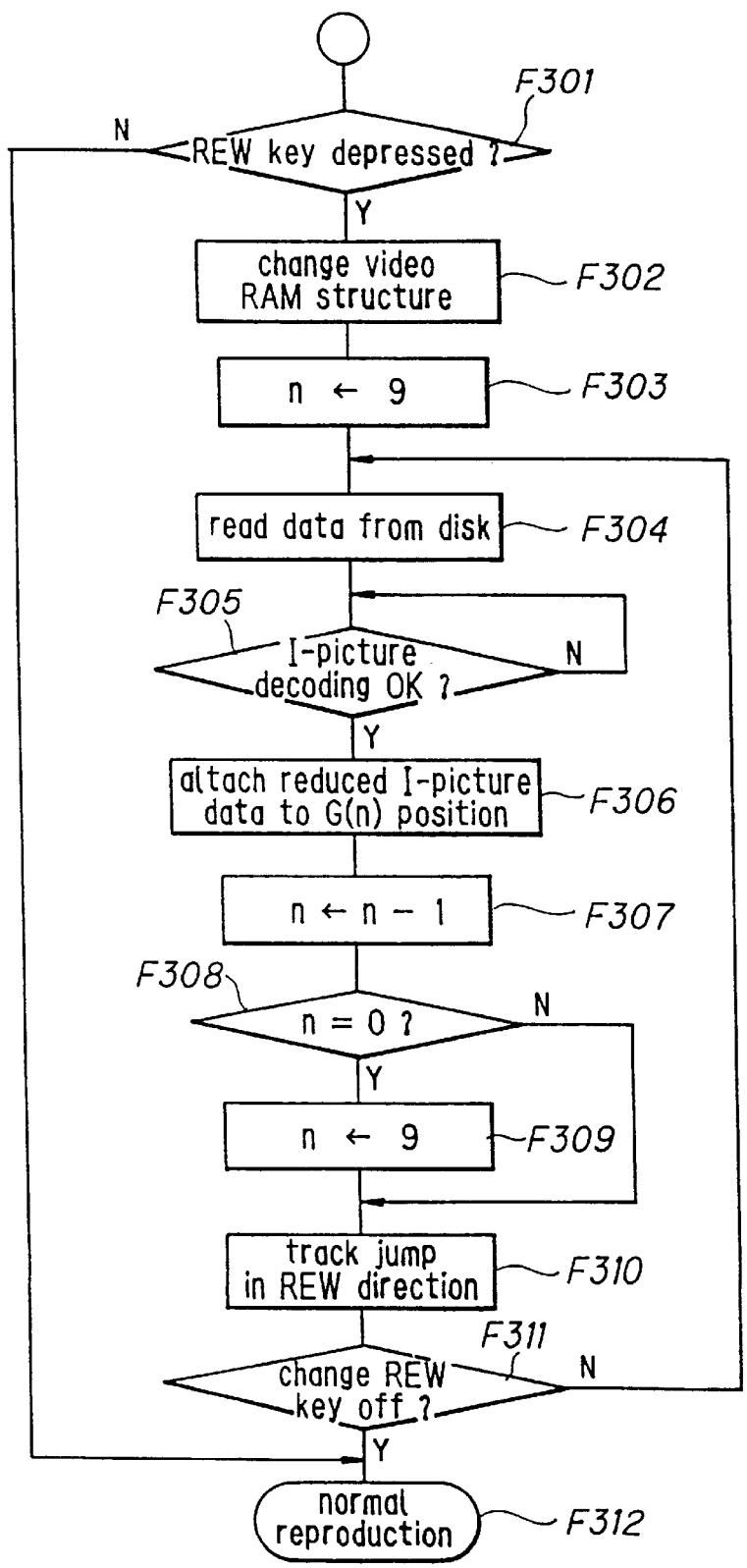
Figure 19:
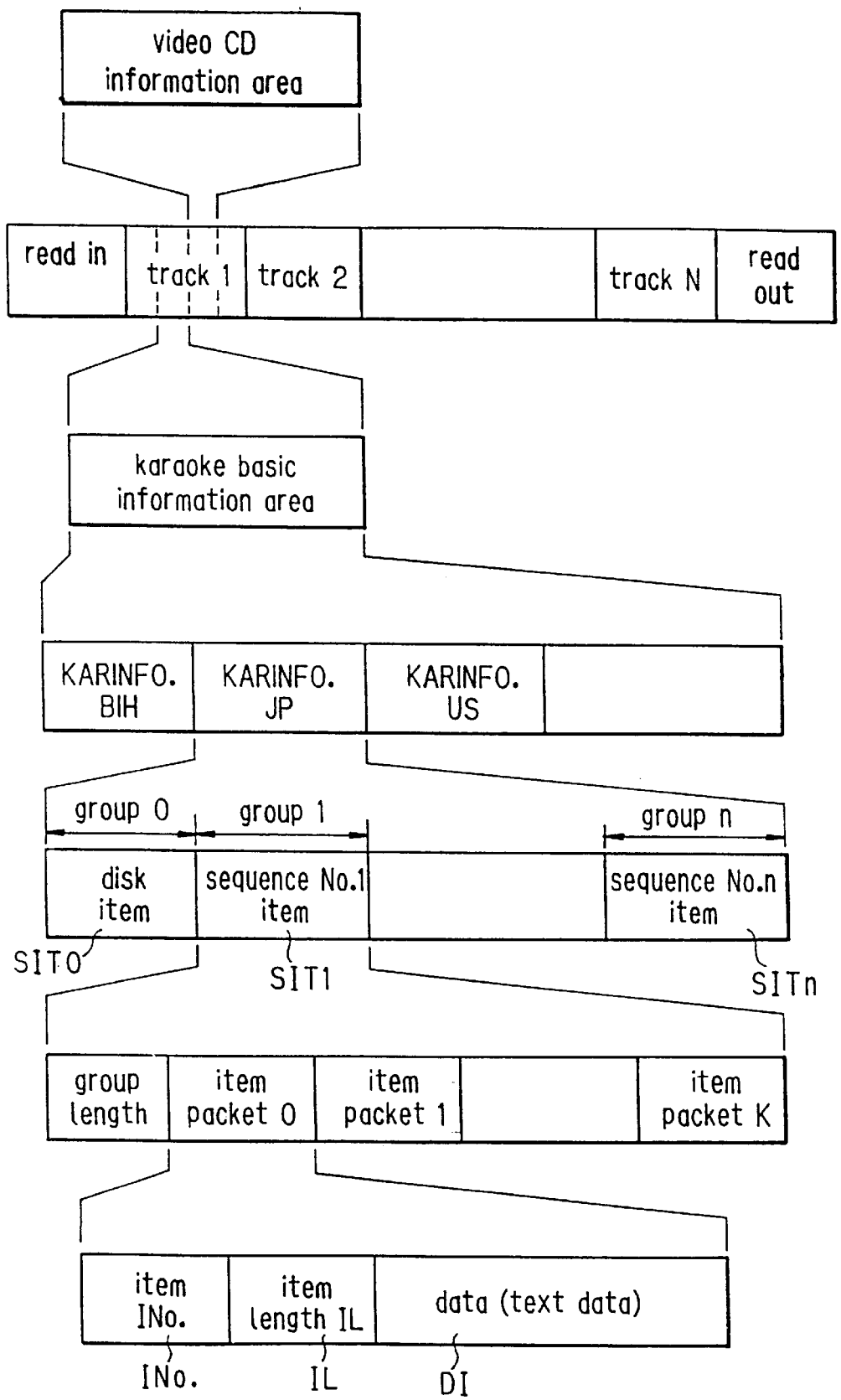
Figure 21:
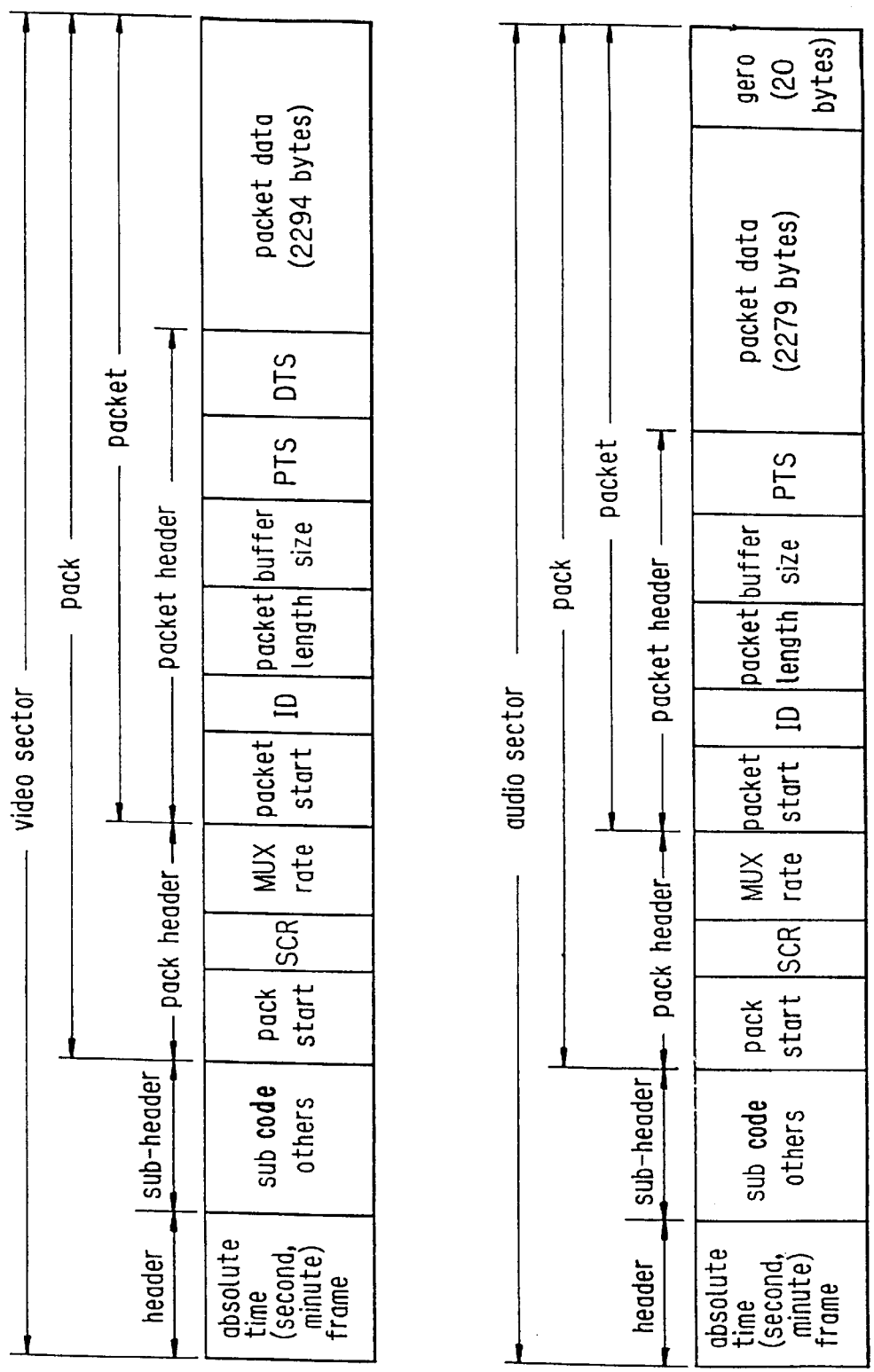
Figures 22, 23:
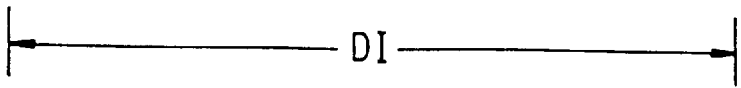
Figure 24:
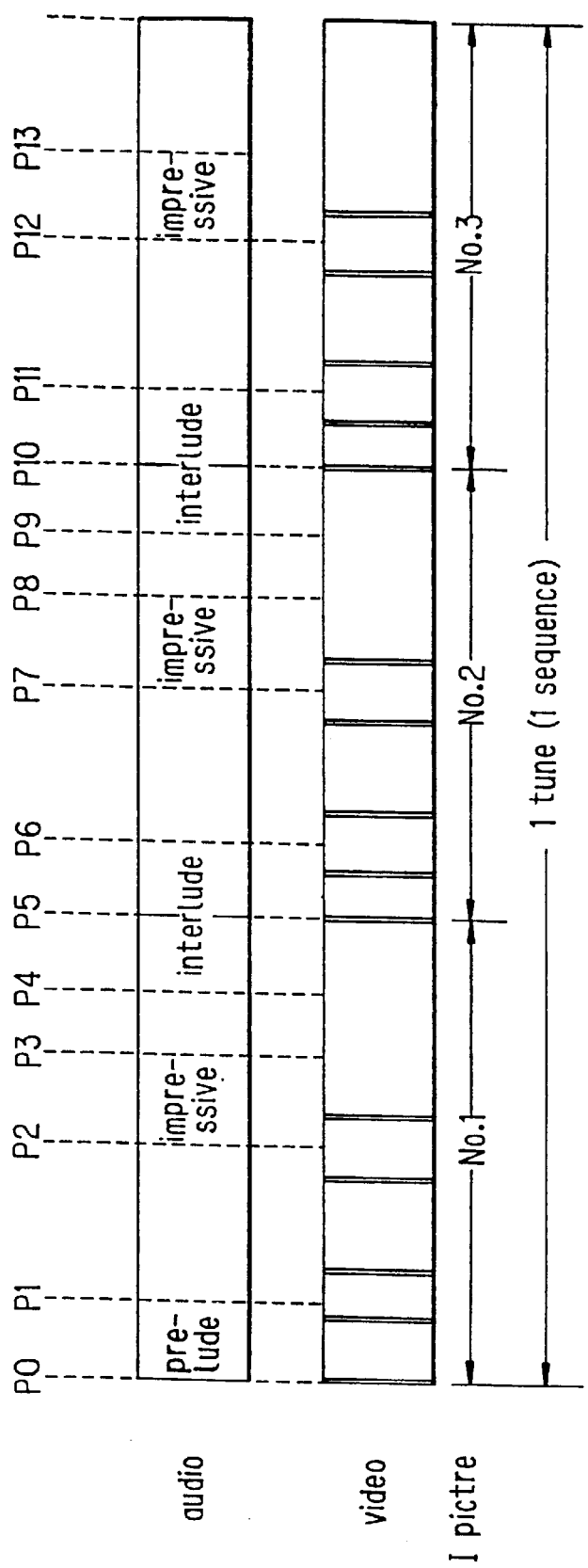
Figure 25:
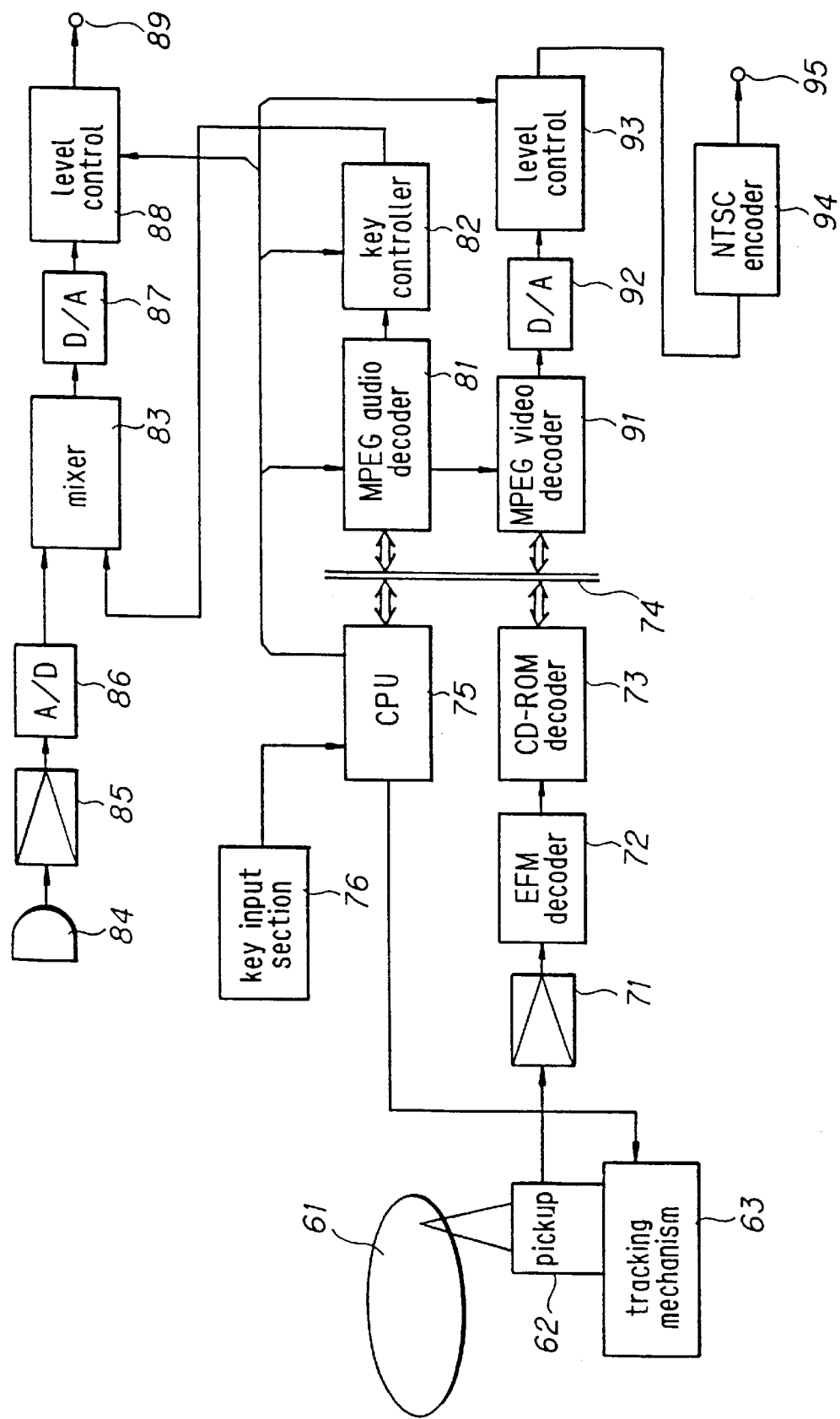

FIGS. 3(a) to 3(e) are explanatory diagrams showing video data of the video-CD;

FIG. 4 is an explanatory diagram showing a screen size of the video-CD;

FIGS. 5(a) and 5(b) are explanatory diagrams showing the structure of a track on the video-CD;

FIG. 6 is a block diagram showing the structure of a reproducing apparatus used in a method of reproducing a recording medium in accordance with first and second embodiments of the present invention;

FIG. 7 is a flowchart showing a processing flow of high-speed reproduction in accordance with the first embodiment of the present invention;

FIG. 8 is an explanatory diagram showing the operation of high-speed reproduction in accordance with the first embodiment of the present invention;

FIG. 9 is an explanatory diagram showing the operation of display at the time of high-speed reproduction in accordance with the first embodiment of the present invention;

FIGS. 10(a) and 10(b) are explanatory diagrams showing the state of use of a video RAM in accordance with the second embodiment of the present invention;

FIG. 11 is an explanatory diagram showing a display region for reduced picture display in accordance with the second embodiment of the present invention;

FIGS. 12(a) to 12(g) are explanatory diagrams showing the display state at the time of an FF search operation in accordance with the second embodiment of the present invention;

FIG. 13 is a flowchart showing a processing flow of the FF search in accordance with the second embodiment of the present invention;

FIGS. 14(a) to 14(g) are explanatory diagrams showing the display state at the time of an REW search operation in accordance with the second embodiment of the invention;

FIG. 15 is a flowchart showing a processing flow of the REW search in accordance with the second embodiment of the invention;

FIG. 16 is an explanatory diagram showing the display region of reduced picture display in accordance with another example of the second embodiment of the invention;

FIG. 17 is an explanatory diagram showing the display region of reduced picture display in accordance with still another example of the second embodiment of the invention;

FIG. 18 is an explanatory diagram showing the display region of reduced picture display in accordance with yet still another example of the second embodiment of the invention;

FIG. 19 is an explanatory diagram showing the format of the video-CD for Karaoke in accordance with the present invention;

FIG. 20 is an explanatory diagram showing data recorded on a track 1 of the video-CD;

FIG. 21 is an explanatory diagram showing the sector structure of the video-CD;

FIG. 22 is an explanatory diagram showing an example of an item packet used for the designation of an access point among a sequence item table;

FIG. 23 is a table showing an example of the structure of event data;

FIG. 24 is an explanatory diagram showing the positional relationship between I-picture and access points for partial reproduction; and FIG. 25 is a block diagram showing the structure of a reproducing apparatus used in a method of reproducing a recording medium in accordance with a third embodiment of the present invention.

DESCRIPTION OF THE INVENTION

Now, a description will be given of a method of reproducing a recording medium in detail in accordance with the present invention. In the respective embodiments to be described below, an example of using a video-CD as a recording medium will be described. The structure of data for the video-CD will be explained before the description of the respective embodiments.

The video-CD standards are provided so that the standardized MPEG system is applied as the high-efficiency coding technique and a moving picture as well as an audio can be reproduced from a CD-ROM disc for 60 minutes or more. As a result, such video-CD standards are useful to a home software such as music, movie, Karaoke and so on, and also applicable to an education software, an electronic publication software, a game software and so on in combination with a still picture.

In the video-CD, moving picture data is compressed by the MPEG system, and superimposed on compressed audio data for recording. Moreover, management data necessary for reproduction is recorded in a given area. FIG. 2 shows the format of data in the video-CD.

In the format of recording an image and audio, as is apparent from FIG. 2, 1.152 Mbit/second are allocated to the video data whereas 64 to 384 Kbit/second are allocated to the audio data. The dimensions of pixels for video data (moving picture) are 352×240 pixels in the case of an NTSC signal (29.97 Hz) as well as a film (23.976 Hz), and 352×288 pixels in the case of the PAL signal (25 Hz), as shown in FIG. 4.

In the case of NTSC, the dimensions of pixels for a still picture are 352×240 pixels in a standard level and 704×480 pixels in a high fine level. In the case of PAL, the dimensions of pixels for a still pixels are 352×288 pixels in the standard level and 704×576 pixels in the high fine level.

The compressing and encoding process of moving picture data due to the MPEG system is made in the following manner. If a video signal before being compressed is of the NTSC system, 1 second is constituted by video signals of 30 frames in the case of the NTSC system.

In the MPEG system, the respective video signals for one frame are divided into 330 blocks which are horizontally 22 blocks×vertically 15 blocks. Data of each block is subjected to the DCT, and also requantized for reducing the number of bits. In other words, a high frequency component in the frequency components of signals is set to 0. Then, the blocks are rearranged in such a manner that they zigzags starting from a block at an upper left position on the screen of one frame. Subsequently, the blocks are subjected to a run-length coding process for further compressing the number of bits.

Thus, in the respective frames of the video signals which are subjected to the compression processing, the frames adjacent to each other in view of time are very similar in video information to each other. Utilizing this fact, information is further compressed so that there are provided three types of video data (video data for one frame) different in compressibility, which, as described above, are called the I-picture, the P-picture and the B-picture, respectively.

In 30 frames for one second, the I-pictures, the P-pictures and the B-pictures are arranged usually as shown in FIG. 3($a$). For example, in this case, I-pictures $I_1$ and $I_1$ disposed at an interval of 15 frames, 8 P-pictures $P_1$ to $P_8$ and 20 B-pictures $B_1$ to $B_{20}$ are arranged, respectively, as shown in FIG. 3($a$). An interval from a certain I-picture to a frame immediately before the next I-picture is called a GPO (Group of Picture).

The I-picture is a normal image data encoded by the conversion of the DCT.

The P-picture, as shown in FIG. 3($b$), is produced from the nearest I-picture or P-picture by encoding it with movement compensation. For example, the P-picture $P_1$ is produced by using the I-picture $I_1$ and the P-picture $P_2$ is produced by using the P-picture $P_1$.

For that reason, the P-picture provides image data which is compressed more than that of the I-picture. Because the P-picture is produced from the I-picture or P-picture being not yet sequenced, an error generated is caused to be propagated.

The B-picture is produced, as shown in FIG. 3($c$), using both of the past and future I-picture or P-picture.

For example, B-pictures $B_1$ and $B_2$ are produced using the I-picture $I_1$ and the P-picture $P_1$, and B-pictures $B_3$ and $B_4$ are produced using the P-picture $P_1$ and the P-picture $P_2$.

The B-picture results in the most compressed data. Also, because of no data producing reference, no error is propagated.

In the algorithm of the MPEG, the selection of a position or synchronization of the I-picture is allowed, and this selection is determined in accordance with the circumstances such as the random access degree or scene cut. For example, if importance is given to random access, two I-pictures are required for at least one second as shown in FIG. 3($a$).

Moreover, the frequency of the P-picture and B-picture is selectable and set in accordance with the memory capacity of an encoder, or the like.

An encoder in the MPEG system is designed to rearrange a video data stream so as to enhance the efficiency of the decoder and to output the rearranged video data stream.

For example, in the case of FIG. 3($a$), the frame sequence to be displayed, that is, the sequence of outputs from a decoder is identical to frame numbers shown at the lower portion of FIG. 3($a$). A P-picture is required as a reference at a point of time before the B-picture in order that the decoder resynthesizes the B-picture. Hence, the encoder rearranges the frame sequence of FIG. 3($d$) as shown in FIG. 3($e$) and propagates it as a video data stream.

The audio data format of the MPEG is adaptable to a coding speed with a wide range from 32 Kbit/second to 448 Kbit/second. Moving picture tracks of a track 2 and following tracks are 224 Kbit/second in coding speed from the software manufacture facilitating and sound quality enhancing standpoints.

The sampling frequency is 44.1 KHz likewise as a compact disc (hereinafter referred to as "CD-DA") on which a normal music information has been recorded.

On the video-CD is recorded video data and audio data as well as management data for allowing the various control of those reproduction operation to be executed.

That is, like the CD-DA, a TOC (table of contents) and sub-codes are recorded on the video-CD. Information such as the number of tracks, the start point of each track or an absolute time is recorded in the TOC.

Subsequently, as a track structure, the data structure of a track on which video data and audio data, for example, which constitute unit data of one tune in music are recorded is shown in FIG. 5($a$).

A pause margin of 150 sectors occupies the head of one track on the assumption that retrieval of a track is made by its track number as in the CD-DA.

15 sectors subsequent to the pause margin forms a front margin, and the last 15 sectors is an empty data region which forms a rear margin.

A MPEG data region is occupied between the front margin and the rear margin. In the MPEG data region, sectors V of video data and sectors A of audio data are multiplexed time-divisionally by interleaving and recorded therein in such a manner that the sectors V and A are arranged at the rate of 6:1 on average as shown in FIG. 5($b$), similarly to FIG. 1.

The video-CD on which the video data as well as the audio data is thus recorded can be reproduced. Furthermore, a description will be given of a reproducing apparatus applied to a method of reproducing a recording medium in accordance with a first embodiment of the present invention, with reference to FIG. 6. The reproducing method according to the first embodiment of the present invention is capable of reproducing a CD-DA on which only audio data has been recorded on a compact disc (hereinafter referred to as "CD-G") on which a still picture has been recorded with sub-code data in the CD-DA system.

In FIG. 6, a reference numeral 30 denotes a disc. The types of the disc 30 which can be reproduced by the apparatus shown in FIG. 6 are a video-CD, a CD-DA and a CD-G.

The disc 30 loaded into the apparatus is chucked by a chucking mechanism, not shown, so as to be rotationally driven by a spindle motor 33. Then, a light beam is irradiated from an optical head 34 toward the disc 30 while the disc 30 is rotated by the spindle motor 33, so that information is read out from the disc 30 by its reflected light beam.

The optical head 34 has an optical system including a laser diode as a light source, a polarization beam spitter, an objective lens 34a and so on, as well as a photodetector for detecting the reflected light beam from the disc 30. The objective lens 34a is held so that it can be displaced by means of an actuator 34b in the radial direction of the disc 30 as well as in a direction along which the objective lens 34a is in contact with and away from the disc 30. A reference numeral 30 denotes a feed mechanism for driving the optical head 34 along the radial direction of the disc 30.

In the reproducing operation, a detection signal which is detected from the disc 30 by the optical head 34, is supplied to an RF amplifier 36. The RF amplifier 36 operates information supplied thereto to thereby produce a reproduced RF signal, a tracking error signal, a focus error signal and so on. The reproduced RF signal thus produced is supplied to a decoder 38 and then subjected to an EFM demodulation and an error correction. P- and Q-channel sub-code data are taken out from the decoder 38 and supplied to a system controller 53.

The tracking error signal and the focus error signal are supplied to a servo circuit 37. Upon receipt of the supplied tracking error signal and focus error signal as well as a track jump command, a seek command and the detection information on the rotational speed of the spindle motor 33 from the system controller 53 and so on, the servo circuit 37 generates a variety of servo drive signals to control the actuator 34b and the feed mechanism 35 for the focus and tracking control, and also to control the spindle motor 33 to a constant linear speed (CLV).

A reference numeral 39 denotes a CD-ROM decoder. In the case where a disc which is being reproduced falls under the category of a so-called CD-ROM such as a video-CD, the CD-ROM decoder 39 executes a decoding processing in accordance with a CD-ROM format.

Management information necessary for the reproduction operation in the signals decoded by the CD-ROM decoder 39, that is, a variety of disc information which have been recorded on the video-CD by using the track 1 are taken in a RAM 53a of the system controller 53.

The audio data decoded by the CD-ROM decoder 39 is supplied to an MPEG audio decoder 40. The MPEG audio decoder 40 decodes the audio data at a given timing using an audio RAM 41 to thereby output a decoded audio signal.

Further, the video data decoded by the CD-ROM decoder 39 is supplied to an MPEG video decoder 42. The MPEG video decoder 42 decodes the video data at a given timing using a video RAM 41 to thereby output a decoded video signal (RGB output).

A reference numeral 44 denotes a switch for executing switching operation in accordance with the type of the disc to be reproduced.

In the case where the disc to be reproduced is of the CD-DA, the decoder 38 executes a decoding processing such as the EFM demodulation and CIRC, thereby obtaining a digital audio signal as a reproduced signal.

During the CD-DA reproducing operation, the system controller 53 makes the switch 44 connected to a terminal $t_1$. Therefore, the digital audio signal from the decoder 38 is converted into an analog audio signal through a D/A converter 45, and a converted digital audio signal is outputted from an audio output terminal 46 to an amplifier circuit disposed at a post-stage or an external equipment such as an amplifier.

In the case where the disc which is being reproduced is of the video-CD, audio data is obtained from the MPEG audio decoder 40. During the video-CD reproducing operation, the system control 53 makes the switch 44 connected to a terminal $t_2$. Accordingly, the digital audio signal from the MPEG audio decoder 40 is converted into an analog audio signal through a D/A converter 45, and a converted digital audio signal is outputted from an audio output terminal 46 to an amplifier circuit disposed at a post-stage or an external equipment such as an amplifier.

In reproducing the video-CD, RGB video data is obtained as an output of the MPEG video decoder 42. That RGB video data is converted into an RGB analog signal through a D/A converter 47. The RGB analog signal is then supplied to an RGB/NTSC encoder 48 where the RGB signal is converted into a composite video signal of the NTSC system, and thereafter supplied to a terminal $t_2$ of a switch 49.

During the video-CD reproducing operation, the system controller 53 makes the switch 49 connected to the terminal $t_2$. As a result, the composite video signal of the NTSC system is supplied from a video output terminal 51 to a monitor device or the like through an OSC processor 50, thus executing a video output. A predetermined superimposing display can be carried out on the video thus outputted in accordance with the operation of the OSD processor 50 which is based on a command from the system controller 53.

In the case where a disc to be reproduced is of the CD-DA which is also of the CD-G, still picture data is read out from R- to W-channels of the sub-code. That still picture data is supplied to a CD-G decoder 52 and decoded before being outputted as a composite video signal (still picture) of the NTSC system. During the CD-DA reproducing operation, the switch 49 is connected to a terminal $t_1$. As a result, the video signal reproduced from the CD-G is supplied from the video output terminal 51 to the monitor equipment or the like through the OSD processor 50, thus executing a video output. Similarly in this case, a predetermined superimposing display can be carried out on the outputted video through the OSD processor 50.

A reference numeral 54 denotes an operating input section by the user's operation, which corresponds to a variety of operating keys, disposed on the casing of the reproducing apparatus, such as a playback key, a stop key, an FF key, an REW key, and a variety of mode setting keys, as well as an infrared ray receiver (and a remote commander).

A reference numeral 55 denotes a display unit consisting of a liquid-crystal panel and so on. In executing the reproducing operation of the disc 30, management information recorded on the disc 30, that is, the TOC and sub-code data are read out from the disc 30 and then supplied to the system controller 53. The system controller 53 makes a track number, a playback time or the like displayed on the display unit 55 in response to those management information.

In the reproducing apparatus of the first embodiment, at the time of a high-speed reproduction such as FF search or REW search, the system controller 53 makes the operation schematically shown in FIG. 8 executed as the operation of the optical head 34. At the time of the high-speed reproduction, an I-picture is extracted discretely from the disc 30 and then displayed. For that reason, the normal reproduction operation is executed as shown in FIG. 8 to search out the I-picture from the disc 30. Then, the I-picture, which has been searched out, is decoded by the MPEG video decoder 42, and simultaneously the optical head 34 is allowed to execute the track jump by several tracks. Upon completion of the track jump, the normal reproduction operation is again executed to search out another I-picture. The above operation is repeated to thereby execute the high-speed reproduction of FF or REW. For example, as shown in FIG. 9, images resulting from the I-picture is switched from the present one to a new one.

The track jump is directed toward the outer peripheral direction of the disc at the time of FF, but toward the inner peripheral direction of the disc at the time of REW.

In the FF/REW operation of the first embodiment, the system controller 53 and the MPEG video decoder 42 execute a processing shown in FIG. 7, whereby, when an image resulting from the I-picture is switched from the present one to a new one as shown in FIG. 9, the timing of renewing an image can be made at substantially constant intervals.

In the operating input section 54, when the FF key or REW key is depressed to execute FF search or REW search, the process advances from Step F101 to Step F102. First, the reproduction operation is executed on the disc 30 to search I-picture data.

In this situation, the system controller 53 has an internal timer actuated to thereby count a period of time $T_1$ during the reproduction operation. For example, the period of time $T_1$ is set to 256 msec.

During the reproduction operation, after I-picture data can be reproduced within 256 msec and then decoded by the MPEG video decoder 42, the process advances from Step F103 to Step F106, where the decoded image data is outputted and then displayed by the monitor unit connected to the apparatus. This display operation is continued until the succeeding process in Step F106 is executed.

After a certain I-picture image starts to be displayed in Step F106, the system controller 53 makes the internal timer count a period of time $T_2$. For example, the period of time $T_2$ is set to one second.

Only an output of display data is executed for this one second, and no track jump is executed (Step F107). Subsequently, after one second is elapsed from the display start, the process advances from Step F107 to Step F108, thereby making the optical head 34 execute the track jump.

Thereafter, the process returns to Step F101, and if the FF key or REW key of the operating section 54 has been depressed, the reproduction operation is then executed in Step F102, to thereby search out the succeeding I-picture data.

Then, when I-picture data could be decoded within the period of time $T_1$, that is, 256 msec, from that reproduction operation, the decoded image data is outputted and displayed on the monitor unit in Step F106. In other words, the display image on the monitor unit is renewed.

Here, it is assumed that the I-picture data cannot be reproduced in good time during the loop processing of Steps F102, F103, F104, F101 and F102 in the stated order, that is, during the execution of the reproduction operation, thereby exceeding 256 msec. In this case, the process advances to Step F105, where it is confirmed whether the image data has been read out during the reproduction operation, or not. In other words, it is judged whether it was a state where a P-picture or B-picture has been read out but no I-picture has been found, or a state where none of I-, P- and B-picture data has been read out.

If image data existed, that is, the P-picture or B-picture has been read, it is a state where a video data track is being reproduced, and the I-picture has been recorded once per two seconds at a minimum. The I-pictures have been recorded more than once per two seconds on most of the discs.

Then, the process returns again to the process of Steps F102, F103 and F104 in the stated order, thereby continuing the operation of reading out the I-picture. As a result, even though it exceeds 256 msec once, the I-picture can be found normally relatively rapidly, for example, in 300 to 500 msec in total.

On the other hand, when it is judged in Step F105 that none of the I-, P- and B-picture data has been read out, a case is considered in which, for example, reproduction scanning is executed between the adjacent tunes, and so on. This is considered to be a state where the I-picture could not be found in good time even though the reproduction is continued as it is.

In this situation, the process advances to Step F108 where the track jump is executed, and then returns to Steps F101 and F102 where the process is shifted to the reproduction operation starting from a position after executing the track jump.

Normally, the I-picture can be found within the period of time $T_1$ (256 msec) through the reproduction operation made in Step F102 in most cases.

The image output resulting from one I-picture is continued for at least a period of time $T_2$ (1 second) or longer through the above processing.

In the case where no I-picture can be decoded within the period of time $T_1$, if the possibility of finding out the I-picture rapidly is low, the process advances to Steps F104, F105 and F108 in the stated order so that the track jump is executed to restart the reproduction operation at another position.

Therefore, as shown in FIG. 9, the respective images are renewed in a period of time $(T_1+T_2\pm\alpha)$, and the period of $T_1$ and $\alpha$ is slight to the degree which could not be recognized by a user. For that reason, the user recognizes that an image is renewed substantially every period of time $T_1$, that is, in about one second. When the process advances to Steps F104, F105 and F108 in the stated order, thereby executing the track jump, the duration of display of an image which is being displayed at that time lengthens somewhat.

For practical purposes, when the reproduction is started at a position such as a position between the adjacent tunes where no I-picture can be read out, the track jump is executed after 256 msec is elapsed so that the reproduction is executed at another position. As a result, because the I-picture data can be normally found out rapidly, the duration of display is not as long as the extent that the user feels unpleasant. It is about 1.5 seconds at the longest.

In other words, in the first embodiment, the display image at the time of FF/REW is renewed every about 1 second (the period of time $T_2$) so that the user feels as if the images are smoothly moved forward or backward at a high speed.

The first embodiment was described above. It does without saying that the periods $T_1$ and $T_2$ may be set in a variety of different manners.

Those periods may be set in accordance with a period of time required for the track jump operation or a search speed.

Also, when the search speed can be changed, the period $T_2$ may be variably set in accordance with the search speed set by the user.

Subsequently, a description will be given of a method of reproducing a recording medium in accordance with a second embodiment of the present invention, with reference to FIGS. 10(a), 10(b) and other figures. The structure of the reproducing apparatus is identical to that of the reproducing apparatus according to the first embodiment as shown in FIG. 6, and therefore for description of the second embodiment, the same reference numerals as those of the reproducing apparatus of the first embodiment shown in FIG. 6 are used.

In the reproducing apparatus of the second embodiment, in order to decode video data read out from a disc 30, an MPEG video decoder 42 uses a video RAM 43 as shown in FIG. 10(a) at the time of a normal reproduction operation.

First, as a region into which image data supplied from a CD-ROM decoder 39, that is, a piece of picture data is taken, a compressed data storing region 43a is set. For the purpose of storing an I-picture or P-picture which has been decoded on a compression processing, there are prepared regions for two screens as I- or P-picture storing regions 43b and 43c. This is because two I- or P-picture data are necessary when a B-picture is decoded. Moreover, there is prepared a B-picture storing region 43b for storing the B-picture. Using the video RAM 43 thus organized, the MPEG video decoder 42 decodes the I-, P- and B-pictures and rearranges the decoded pictures in an appropriate sequence of display outputs to output the rearranged pictures.

At the time of a high-speed reproduction such as FF or REW, the system controller 53 makes the optical head 34 execute the same operation as that in the first embodiment, as shown in FIG. 8. At the time of the high-speed reproduction, an I-picture is extracted discretely from the disc 30 and then displayed. For that reason, the normal reproduction operation is executed as shown in FIG. 8 to search out the I-picture from the disc 30. Then, the I-picture, which has been searched out, is decoded by the MPEG video decoder 42, and simultaneously the optical head 34 is allowed to execute the track jump by several tracks. Upon completion of the track jump, the normal reproduction operation is again executed to search out another I-picture. The above operation is repeated to thereby execute the high-speed reproduction of FF or REW. The track jump is directed toward the outer peripheral direction of the disc 30 at the time of FF, but toward the inner peripheral direction of the disc 30 at the time of REW.

In the second embodiment, in the case of FF/REW, the decoded I-picture is not outputted as one screen as it is, but the respectively read I-pictures are sequentially displayed at a predetermined region on a screen as a ⅑ reduced screen. In other words, the MPEG video decoder 42 outputs image data so that display regions $G_1$ to $G_9$ are set on the display screen of a monitor unit connected to the reproducing apparatus as shown in FIG. 11, and the decoded I-pictures are sequentially displayed thereon. For example, at the time of FF, an I-picture initially read out is displayed on the $G_1$ region, and when another I-picture is read out succeedingly, this I-picture is displayed on the $G_2$ region while the display on the $G_1$ region is left as it is. Still another I-picture is displayed on the region $G_3$. Such display operation is performed. In other words, reduced I-pictures are displayed sequentially on the regions $G_1$ to $G_9$ in the stated order of $G_1$, $G_2$, $G_3$, $G_4$, $G_5$, $G_6$, $G_7$, $G_8$, $G_9$, $G_1$, . . . .

Also, for example, at the time of REW, the reduced I-pictures are displayed sequentially on the regions $G_1$ to $G_9$ in the reverse order, that is, in the stated order of $G_9$, $G_8$, $G_7$, $G_6$, $G_5$, $G_4$, $G_3$, $G_2$, $G_1$, $G_9$, . . . .

For that reason, at the time of the high-speed reproduction such as FF or REW, setting of the regions in the video RAM 43 is changed as shown in FIG. 10(b). The compressed data storing region 43a is left as it is so that data inputted before being decoded is stored in the compressed data storing region 43a. Because what is decoded is only the I-picture, an I-picture storing region 43e for one screen is provided. As shown in FIG. 11, for the purpose of executing a division display for reduced screens, a division display memory region 43f is provided. It is possible to set the division display memory region 43f more than twice as large as the storing region for the normal I-, P- and B-pictures. This is because the B-picture is unnecessary with the result that two pieces of I- or P-picture storing regions are not required as reference data used for decoding the B-picture, and because decoding of only the I-picture can be made in a relatively small buffer region.

The decoded I-picture is reduced to a size of ⅑ on the division display memory region 43f, and that data is affixed to a predetermined region, thereby enabling the reduced image to be displayed thereon sequentially.

The number of pixels of image data for one screen in the video-CD conforming to the NTSC system is horizontally 352 dots×vertically 240 lines as shown in FIG. 2.

On the contrary, in the MPEG video decoder 42, the dot number and line number of the decoded I-picture are reduced to ⅓, respectively, thereby enabling ⅑ reduced image data to be produced. This is affixed to a position corresponding to any region of $G_1$ to $G_9$ of FIG. 11 in the division display memory region 43f so that the MPEG video decoder 42 outputs image data produced in the division display memory region 43f.

The operation at the time of FF and REW will be described below in detail.

FIGS. 12(a) to 12(g) show display states at the time of FF, and FIG. 13 shows the processing of the system controller 53 and the MPEG video decoder 42 at the time of FF. In this example, it is assumed that the FF operation is executed while the user continuously depresses an FF key of the operating unit 54.

When the user depresses the FF key in the operating unit 54, the process advances from Step F201 to Step F202. Setting of regions in the video RAM 43 is changed from a state of FIG. 10(a) to a state of FIG. 10(b).

Subsequently, a variable n is set to 1 (Step F203).

Then, as shown in FIG. 8, the operation of reproducing the disc 30 is first executed to read the I-picture (Step F204). The I-picture data is supplied to the MPEG video decoder 42 where the I-picture data supplied is decoded appropriately (Step F205). The decoded I-picture data is reduced to a data size of ⅑ and allocated to a position corresponding to a display region G(n) within the division display memory region 43f. In this case, because of n=1, an I-picture initially read is affixed to a position corresponding to G1 within the division display memory region 43f so that the I-picture is displayed at the region $G_1$ on the monitor unit connected to the reproducing apparatus as shown in FIG. 12(a).

Subsequently, the variable n is subjected to increment (Step F207) and makes the optical head 34 jump over tracks toward an FF direction, that is, toward the outer periphery of the disc (Step F210) as it is if the variable n is not 10. Then, if the user continues the FF operation without any change, the process returns to the processing of Step F204 after the track jump is executed, so that the reproduction operation is executed to search the I-picture.

Thereafter, the I-picture data read from the disc 30 and decoded is reduced through the processing of Steps F204 to F206 because of the variable n=2, and affixed to a position corresponding to the region $G_2$ within the division display memory region 43f. Hence, on the monitor unit, the present I-picture is displayed at the region $G_2$ while the previous I-picture is displayed at the region $G_1$, as shown in FIG. 12(b).

In this manner, while the variable n is subjected to increment, the processing of Steps F104 to F110 is repeated, whereby the display state is changed in the stated order of FIGS. 12(b), 12(c), 12(d), . . . , and 12(e). In other words, the reduced images resulting from the I-pictures sequentially read out from the disc 30 are displayed at the respective regions $G_1$ to $G_9$ in order.

At the time of the state shown in FIG. 12(e), the variable n is subjected to increment so that the variable n becomes 10 in Step F207. Accordingly, the process advances from Step F208 to Step F209 so that the variable n is set to 1.

The I-picture succeedingly read through the track jump operation (Step F210) and the reproduction operation (Step F204) is decoded and reduced before being affixed to a position corresponding to the display region G1 within the division display memory region 43f. In other words, the display data in the region $G_1$ is rewritten, and the display is changed as shown in FIG. 12(f).

Upon further continuing the processing, the display data at the region $G_2$ in the division display memory region 43f is rewritten due to the succeeding I-picture, and the display is changed as shown in FIG. 12(g). In this manner, the respective regions are rewritten in order likewise.

When the user stops the depression of the FF key in the operating unit 54, the FF operation is completed. In other words, the process advances to Step F212 so that setting of a region in the video RAM 43 returns to the state shown in FIG. 10(a) where the normal reproduction operation is executed.

Subsequently, a description will be given of the display state at the time of REW as well as the processing of the system controller 53 and MPEG video decoder 42 with reference to FIGS. 14(a) to 14(g) and 15. Likewise, the REW operation is executed while the user continuously depresses the REW key.

When the user depresses the REW key in the operating unit 54, the process advances from Step F301 to Step F302, where setting of the region in the video RAM 43 is changed from the state of FIG. 10(a) to the state of FIG. 10(b).

Subsequently, the variable n is set to 9 (Step F303).

Figure 14A:
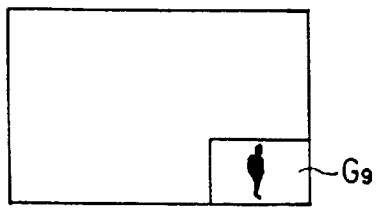

Then, as shown in FIG. 8, the operation of reproducing the disc 30 is first executed to read the I-picture (Step F304). The I-picture data is supplied to the MPEG video decoder 42 where the I-picture data supplied is decoded appropriately (Step F305). The decoded I-picture data is reduced to a data size of ⅑ and allocated to a position corresponding to a display region G(n) within the division display memory region 43f. In this case, because of n=9, an I-picture initially read is affixed to a position corresponding to $G_9$ within the division display memory region 43f so that the I-picture is displayed at the region $G_9$ on the monitor unit connected to the reproducing apparatus as shown in FIG. 14(a).

Subsequently, the variable n is subjected to decrement (Step F307) and makes the optical head 34 jump over tracks toward a REW direction, that is, toward the inner periphery of the disc (Step F310) as it is if the variable n is not 0. Then, if the user continues the REW operation without any change, the process returns to the processing of Step F304 after the track jump is executed, so that the reproduction operation is executed to search the I-picture.

Thereafter, the I-picture data read from the disc 30 and decoded is reduced through the processing of Steps F304 to F306 because of the variable n=8, and affixed to a position corresponding to the region $G_8$ within the division display memory region 43f. Hence, on the monitor unit, the present I-picture is displayed at the region $G_8$ while the previous I-picture is displayed at the region $G_9$, as shown in FIG. 14(b).

Figure 14F:
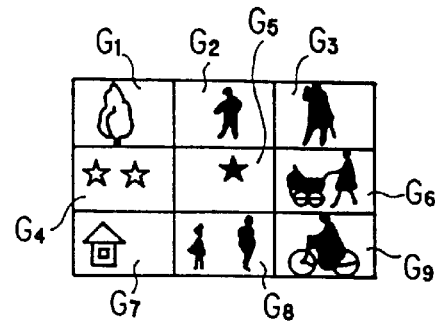
Figure 14B:
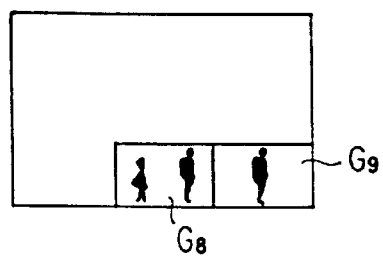
Figure 14C:
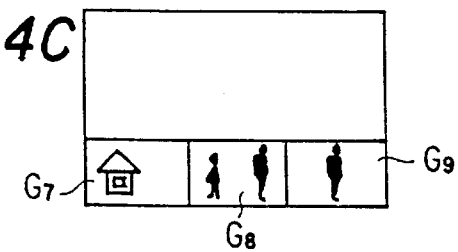
Figure 14G:
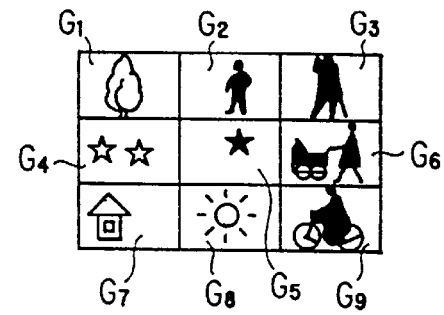
Figure 14D:
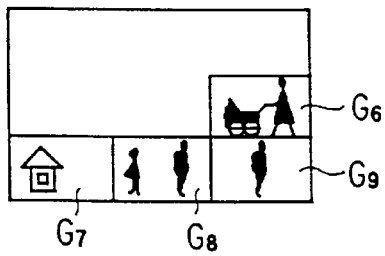

In this manner, while the variable n is subjected to decrement, the processing of Steps F304 to F310 is repeated, whereby the display state is changed in the stated order of FIGS. 14(b), 14(c), 14(d), . . . , and 14(e). In other words, the reduced images resulting from the I-pictures sequentially read out from the disc 30 are displayed at the respective regions $G_9$ to $G_1$ in order.

Figure 14E:
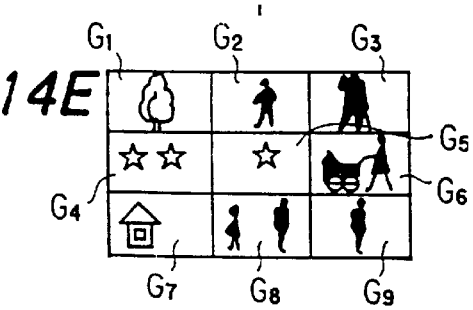

At the time of the state shown in FIG. 14(e), the variable n is subjected to decrement so that the variable n becomes 0 in Step F307. Accordingly, the process advances from Step F308 to Step F309 so that the variable n is set to 9.

The I-picture succeedingly read through the track jump operation (Step F310) and the reproduction operation (Step F304) is decoded and reduced before being affixed to a position corresponding to the display region $G_9$ within the division display memory region 43f. In other words, the display data in the region $G_9$ is rewritten so that the display is changed as shown in FIG. 14(f).

Upon further continuing the processing, the display data at the region $G_8$ in the division display memory region 43f is rewritten due to the succeeding I-picture so that the display is changed as shown in FIG. 14(g). In this manner, the respective regions are rewritten in order likewise.

When the user stops the depression of the REW key in the operating unit 54, the REW operation is completed. In other words, the process advances to Step F312 so that setting of a region in the video RAM 43 returns to the state shown in FIG. 10(a) where the normal reproduction operation is executed.

In the second embodiment, when the FF search or REW search has been executed, the duration of display of one search image, that is, one I-picture comes to a duration until search images for 9 sheets are displayed. In other words, each image continues to be displayed for a very long period of time, for example, for 10 seconds or more, as a result of which the visibility of one screen to the user is very improved. Hence, there is no problem that the user overlooks a portion to be searched.

Also, as described above, in view of the improvement in the visibility of one sheet of image, a timing control such as a waiting for decoding of the read I-picture is not always required, thereby being capable of facilitating the processing.

Moreover, because the user can watch the scene of the development of the search at a time, he can readily grasp the contents of video and easily search a portion to be searched.

Further, because the sequence of the display progress for the division image at the time of FF is reverse to that at the time of REW (the sequence of outputs at the display regions $G_1$ to $G_9$), it can be judged whether it is the FF search or REW search by simply watching the screen.

Still further, such a display is visually interesting, and the pleasure of the user in using the reproducing apparatus is increased.

In the above embodiment, the screen is divided into 9 sub-screens, however, it goes without saying that the division of the screen may be made in other ways.

FIG. 16 shows an example in which one screen is divided into 4 regions $G_1$ to $G_4$.

In this example, ¼-reduced images may be displayed, for example, in the stated order of $G_1$, $G_2$, $G_3$, $G_4$, $G_1$, ... at the time of FF, but in the stated order of $G_4$, $G_3$, $G_2$, $G_1$, $G_4$, ... at the time of REW.

Alternatively, ¼-reduced images may be displayed clockwise in the stated order of $G_1$, $G_2$, $G_4$, $G_3$, $G_1$, ... at the time of FF, but counterclockwise in the stated order of $G_4$, $G_2$, $G_1$, $G_3$, $G_4$, ... at the time of REW.

FIG. 17 shows an example in which one screen is divided into 16 regions $G_1$ to $G_{16}$.

In this example, ¹⁄₁₆-reduced images may be displayed, for example, in the stated order of $G_1$, $G_2$, $G_3$, $G_4$, $G_5$, $G_6$, ... $G_{15}$, $G_{16}$, $G_1$, ... at the time of FF, but in the stated order of $G_{16}$, $G_{15}$, $G_{14}$, $G_{13}$, $G_{12}$, $G_{11}$, ... $G_3$, $G_2$, $G_1$, $G_{16}$, ... at the time of REW.

Alternatively, ¹⁄₁₆-reduced images may be displayed clockwise in the spiral form such as the order of $G_1$, $G_2$, $G_3$, $G_4$, $G_8$, $G_{12}$, $G_{16}$, $G_{15}$, $G_{14}$, $G_{13}$, $G_9$, $G_5$, $G_6$, $G_7$, $G_{11}$, $G_{10}$, $G_1$, ... at the time of FF, but counterclockwise in that reverse order at the time of REW.

FIG. 18 shows a case where 8 regions $G_1$ to $G_8$ each having the region size of ⅛-reduced image are used. For example, it is considered that the ⅛-reduced images are displayed in order clockwise at the time of FF, but in order counterclockwise at the time of REW.

In the second embodiment, while the FF/REW search is being executed as described above, the normal reproduction and track jump are repeated. Therefore, in the duration of reproduction for searching the I-picture, audio data can be taken in.

As shown in FIG. 5(b), since the video sectors and the audio sectors are arranged time-divisionally, the audio sector can be also reproduced until the I-picture is reproduced. Normally, at least one audio sector can be read out per the reproduction operation of 80 msec.

Therefore, at the time of the FF/REW search, the audio data read out is decoded by the MPEG audio decoder 40 and can be outputted as sound.

The outputted sound becomes sound having the pitches of the normal reproduction although it is discontinuous.

The sound thus outputted can serve as a guide of the scene search, and in the high-speed search operation of a relatively row speed where the number of jumped tracks in the track jump operation are reduced, it is possible to watch a disc, for example, on which a movie has been recorded in a short period of time.

Subsequently, a description will be given of a method of reproducing a recording medium in accordance with the third embodiment of the present invention with reference to the accompanying drawings. Before turning to the description of the third embodiment, a format of the video-CD for Karaoke will be described.

FIG. 19 is an explanatory diagram showing the recording format on the video-CD for Karaoke. In other words, the video-CD has a lead-in track at the top thereof as shown in FIG. 19, as in the normal CD-ROM, and tracks 1 to N of N data (N≦99) and a lead-out track are subsequent to the lead-in track. Compressed audio data and compressed moving picture data are recorded on the second and subsequent tracks 2 to N of the tracks 1 to N. Each of the tracks 2 to N corresponds to one tune (1 sequence), and (N−1) tunes can be recorded on the video-CD.

A variety of information and data on the contents of the mvideo-CD are recorded on the first track 1, and information that the video-CD is in the Karaoke format is also described on the track 1.

Moreover, as shown in FIG. 19, a Karaoke basic information area, a video-CD information area and so on are provided on the track 1. In the Karaoke basic information area, there are contained basic information on Karaoke on the disc for each language of countries in which the disc of question is used, such as "KARINFOR. JP" (for Japan), "KARINFOR. US" (For U.S.) and the like. "KARINFO. BIH" where the number of basic information for each country and the number of tunes on the disc are described is also contained in the Karadke basic information area.

Karaoke data tables of n=(N−1) tunes are recorded as the basic information on Karaoke provided for each country. The data tables are called "sequence item tables" and each data table is organized independently. In other words, n=(N−1) sequence item tables SIT1 to SITn are provided in correspondence with the respective Karaoke tunes. Apart from the tables for each tune, there is provided a data table SITP having information on the video-CD, which is called "disc item table". Disc titles, the total number of tunes, disc catalog numbers and so on are recorded in the disc item table SITO.

The sequence item tables SITi (i=1 to (N−1)) have 64 items which are necessary or arbitrary. The length of the contents in each item is variable. For that reason, information GL indicative of the length of the table is provided at the head of the sequence item table SITi. Data in each item is called an item packet, and each item packet is constituted by each item number (hereinafter referred to as "item number") INo., information on the length of the item, and the contents ID (text data) of the item.

FIG. 20 shows the structure of the table SITi. For example, item No. 9 defines the item of a tune, and its contents are data indicative of the name of the tune as text data. Alternatively, item No. 18 defines the item of a text, and the text is contained in the format of text data. Item Nos. 22 to 31 are open to makers and can be freely defined by the makers for use.

As described above, the format of the above-described old video-CD provides no position of the I-picture in compressed moving picture data as information. On the contrary, in the format of the revised video-CD, there is provided in the video-CD information area of the first track 1 an entry table in which the recording position of a predetermined I-picture as an entry point is represented by time information on the disc and is then tabled, so that the high-speed reproduction operation or the reproduction from the middle of a tune can be executed. The entry table is provided every track, and the entry points are sequentially recorded on the disc at the rate of 98 points per one track (1 sequence) at the maximum. The time from the head of each track is used for time information of the entry point.

FIG. 21 shows the data structure of the video sector and the audio sector. As shown in FIG. 21, one sector is constituted in such a manner that a header and a sub-header are added, respectively, in front of data group of 2324 bytes, which is called "pack". Information of an absolute time from the innermost periphery to the subject sector is represented by minutes, seconds and frames and recorded in the header. Sub-code information is contained in the sub-header so that it can be recognized whether the subject sector is a video sector or an audio sector in accordance with that sub-mode information.

The video sector and the audio sector are slightly different in the contents of the pack. In other words, a pack header common to the video sector and the audio sector is provided at the head of the pack. A "pack start" in the pack header is data indicating that the pack starts from that position. An "SCR (System Code Reference)" is data indicative of a time when pack data is read out. An "MUX rate" represents the transfer rate of compressed video data to compressed audio data.

The contents of the pack header within the packet portion except for the pack header in the pack data are different between the video sector and the audio sector. A "packet start" within the packet header is data indicating that the packet starts from that position, and an "ID" indicates whether the packet is of a video packet or audio packet. A "packet length" indicates the length of the packet data, and a "buffer size" is information instructing a buffer size necessary for decoding.

Also, a "PTS (Present Time Stamps)" indicates a time when the reproducing apparatus outputs a moving picture or sound. Referring to the PTS, the reproducing apparatus recognizes which image is to be outputted at an output timing of sound.

The packet header on and before the "PTS" is common between the video sector and the audio sector, and in the audio sector, compressed audio data is recorded after the "PTS". On the other hand, in the video sector, a "DTS (Decode Time Stamp)" in which a time when data is transported to the decoder is described is provided after the "PTS", and compressed video data is subsequently recorded.

A description will be given of a method of reproducing a recording. medium in accordance with a third embodiment of the present invention.

(In the Case of the Old Video-CD Format)

As described above, no information on the entry point is recorded in the video-CD. However, in this example, information on the access point of a partial sequence is recorded on the items of the above-mentioned item Nos. 22 to 31, which can be freely defined and used by the maker, within the sequence item table of the Karaoke basic information area on the first track 1 in the video-CD. The information on the access point of the partial sequence is recorded as time information from the position of the head of each track. The time of the head position of each track is described on the track 1, or can be obtained from data described in the track 1.

Also, in this example, the access point of the partial sequence is recorded at any one of item Nos. 22 to 31 or a plurality of items together with attribute information on how control is made at its start or end point, in addition to time information.

FIG. 22 shows an example of one item packet used for designating the access point of the partial sequence within the sequence item table. The item number, as described above, is any one of item Nos. 22 to 31 which can be freely defined and used by the maker. In the following description, it is assumed, for example, that the item packet of item No. 22 is for the access point of the partial sequence.

In the data DI of the item contents shown in FIG. 22, information is described as text data using character codes defined by KARINFO. BIH. In this example, the ADCII code is used as the character code for data values on the assumption that it is of the Shift JIS.

In the data DI of the item contents shown in FIG. 22, "E" is event data (2 bytes) representative of control information at the time of the partial reproduction, an "EH" is its high-order bits (1 byte), and "EL" is its low-order bits (1 byte). Also, "M", "S" and "F" represent time information on "minute", "second" and "frame", respectively. They indicate the position of the access point in the partial sequence by time. "MH", "SH" and "FH" are their high-order bits (1 byte), and "ML", "SL" and "FL" are their low-order bits (1 byte). In this example, time information is time information starting from the head position on the track of each tune (sequence).

In this example, the high-order bits EH, as shown in a table of FIG. 23, are indicative of the sorts of partial sequence designated such that an access point of question is an impressive point representing the so-called impressive portion, an n-chorus point representing the n-th chorus portion of a tune, or the like. The low-order bits EL of the event data are data for indicating in which mode starting or ending operation is executed at a point indicated by the item packet of item No. 22.

In this example, as shown in FIG. 23, in the access point designated by the item packet of item No. 22, two modes can be designated in accordance with the code of the low-order bits EL of the event data E, one of which is to simply execute an on-operation (start) and an off-operation (end) and the other of which is to control the fade-in or fade-out operation of only an audio signal or video signal, or the fade-in or fade-out operation of both the audio and video signals. In FIG. 23, symbol (H) denotes hexadecimal display.

In the case where a plurality of access points exist in each tune, sets of the position data M, S, F and their attribute data E are sequentially described within the data DI of the item packet of item No. 22. In other words, in this example, within the data DI of the item packet of item No. 22, 8 bytes (8 bytes in total because of each data E, M, S and F being of 2 bytes) per one access point are recorded in order on a plurality of access points within a tune.

In the reproducing apparatus, the data DI of item No. 22 is segmented every 8 bytes, and an impressive point, n-chorus point, interlude point or the like can be recognized from the high-order bits EH of the event data E, which is 1 byte at the head of data thus segmented every 8 bytes. How control is executed at a point of question can be recognized from the low-order bits EL of the event data E, which is the succeeding 1 byte. Then, a position of the point of question can be known from the third to eighth bytes MH to FL of data each being constituted by 8 bytes.

The reproducing apparatus is provided with modes of "only impressive portion replay", "only n-th chorus replay", "interlude omission" and so on, as modes of reproducing only the impressive portion, and equipped with mode designating keys corresponding to those modes on a key input section. With only the user's operation of depressing the keys designating the above modes, the reproducing apparatus automatically searches the position of each point to execute the audio reproduction as well as the video reproduction.

By using the video-CD on which the position data for the access point of the partial sequence as well as the attribute data related to that point has been recorded on any portion of item Nos 22 to 31 which are opened to the user in the sequence item table in the above manner, the reproducing apparatus is capable of readily reproducing the partial sequence of the video-CD of question, using the information of the sequence item table.

However, as described above, the extension decoding of the moving picture data must be executed from the position of 1 picture. However, the I-picture is simply standardized so that one I-picture is necessarily recorded within two seconds, and its recording position is not particularly standardized. In this situation, it is proposed that the I-picture be recorded at the head of the tune or chorus, but the starting or ending position of the impressive portion, prelude, interlude or the like may not necessarily be at the position of the I-picture. Hence, in the case of executing the partial reproduction, even though the moving picture data is subjected to the extension decoding processing from the access point, a moving picture cannot be obtained with accuracy without any processing.

FIG. 24 is a diagram showing a relationship between the access point of the partial sequence and audio data as well as video data in a certain tune (1 sequence). In the video data of FIG. 24, the portions of I-pictures are indicated by the parts of oblique lines. The I-pictures, as described above, are recorded in such a manner that one I-picture necessarily exists within an interval of two seconds. In FIG. 24, for the simplification of description, only an I-picture at a position related to the description of the present invention is shown.

In FIG. 24, symbol P0 denotes a head point of a tune, in correspondence with which an I-picture is recorded as video data. Similarly, P5 and P10 are head points of the second chorus (the second of the tune) and the third chorus (the third thereof), respectively. Similarly to P0, I-pictures are recorded at P5 and P10 as video data, respectively. They are points from which the reproduction is started at modes of the partial sequence such as the reproduction of only the first, second or third chorus.

P1 denotes a point at which the prelude at the head of the first chorus ends, and the prelude ending point P1 is used as a reproduction start point when the partial reproduction is carried out with the omission of the prelude. However, in FIG. 24, no I-picture exists as video data corresponding to the audio data at the point P1.

P2, P7 and P12 represent start points of the impressive portions of the first, second and third choruses, respectively. P3, P8 and P13 represent end points of the impressive portions of the respective choruses. Although the start points of the impressive portions represent the reproduction start points, in the example shown in FIG. 24, no I-picture exists as video data corresponding to audio data at those start points.

P4 and P9 represent start points of an interlude from the first chorus to the second chorus and an interlude from the second to the third chorus, respectively. P6 and P11 represent end points of those interludes, respectively. These points are utilized when the interlude is omitted. The end point of the interlude is an access point from which the reproduction is started at the mode of the interlude omission. It is preferable that an I-picture is recorded as video data corresponding to the audio data at the interlude end point. However, in FIG. 24, such an I-picture is not recorded.

In view of the above, in this embodiment, with the organization to be described below, even in the partial reproduction as well as the restart of the reproduction from the omission, the moving picture can be always reproduced with accuracy.

(First Reproducing Method for Video-CD Due to Old Format)

An I-picture necessarily exists between a point 2 seconds before an access point and the access point in view of time in conformity with the standard of the video-CD. In the first reproducing method, in the case of the access point being the reproduction start, the position of the I-picture within 2 seconds before the access point is searched prior to the reproduction operation, so that the reproduction decoding of moving picture data is started from that I-picture. An output of the reproduced moving picture signal is not applied to the display monitor unit. Then, time information in the signal which is being reproduced is monitored, and upon the arrival at the access point, the extension decoding of audio information as well as the output of the reproduced signal is started while the output of the reproduced moving picture signal is applied to the display monitor unit.

In the first reproducing method, the audio information and the moving picture information associated therewith are simultaneously reproduced from the access point. In outputting reproduced signals, control in accordance with the attribute of the above-mentioned access point, for example, the fade-in control and so on are carried out together.

(Second Reproducing Method for Video-CD Due to Old Format)

In the above-mentioned first reproducing method, the I-picture before the access point is searched so that the moving picture data is reproduced and decoded from that I-picture. In this second reproducing method, the reproduction of the moving picture data is started from the I-picture after the access point.

In the second reproducing method, the reproduced audio information starts to be outputted from the access point. However, the moving picture information, because of the delay of its reproduction, starts to be displayed on the display unit late by the amount of that delay.

FIG. 25 is a block diagram showing an example of the above-mentioned reproducing apparatus for the video-CD. In other words, in the reproducing apparatus shown in FIG. 25, a light pickup 62 allows a signal recorded on a video-CD 61 to be reproduced from the video-CD 61. The signal thus reproduced is supplied to an EFT decoder circuit 72 through a reproduction amplifier 71, where it is subjected to processing such as an EFM demodulation and an error correction. The signal thus processed is supplied to a CD-ROM decoder circuit 73 where it is subjected to a decoding processing per a sector unit, thereby being outputted.

The data of a first track 1 in the output signal of the CD-ROM decoder circuit 73 is taken in a controller 75, which is composed of a microcomputer, through a system bus (consisting of an address bus and a data bus) so that the data is used for playback control which will be made later.

The compressed video data in the output signal of the CD-ROM decoder circuit 73 is taken in an MPEG video decoder circuit 91 so that initial video signals such as a luminance signal and two color-difference signals are demodulated. The digital video signal thus decoded is digital-to-analog converted into an analog video signal in a D/A converter circuit 92, and the analog video signal thus converted is supplied to a level control circuit 93 for fade-in or fade-out. The video signal outputted from the level control circuit 93 is supplied to an NTSC encoder circuit 94 so as to be encoded into a color composite video signal of the NTSC system which is outputted to a terminal 35.

The data of the audio signal in the output signal from the CD-ROM decoder circuit 73 is taken into an MPEG audio decoder circuit 81 so that initial signals such as audio signals of right and left channels of Karaoke, that is, an accompaniment are decoded. The decoded audio signal is supplied to a key control circuit 82.

The reproducing apparatus shown in FIG. 25 further includes a key input section 76 an output of which is supplied to the controller 75. The output of the operating section for adjusting the speed of a tune in the key input section 76 is supplied to the controller 75. The controller 75 makes the rotational speed of the video-CD 61 and the decoder circuits 81 and 91 controlled in such a manner that the reproducing speed of the video signal and audio signal is changed in accordance with the output of the input section 75. Also, the key control circuit 82 allows a change of the signal resulting from the change of the reproducing speed to be corrected.

The audio signal from the key control circuit 82 is supplied to a mixer circuit 83. The audio signal representative of the vocals of a singer is supplied from a microphone 84 through an amplifier 85 to an A/D converter circuit 86 where it is subjected to an A/D conversion. The audio signal thus converted is supplied to the mixer circuit 83.

The mixer circuit 83 allows the audio signal representative of Karaoke, that is, the accompaniment of a tune to be mixed with the audio signal representative of the vocals, thereby outputting an audio signal where Karaoke is added to the vocals therefrom. The audio signal thus mixed is supplied to a D/A converter circuit 87 so that it is subjected to a D/A conversion. After the audio signal thus converted is supplied to a level control circuit 93 for fade-in or fade-out, the audio signal thus level-controlled is outputted from an output terminal 89.

In this case, data related to the production of the partial sequence described at any one of item Nos. 22 to 31, in this example, at item number 22 shown in FIG. 20 is taken out from data of the table SITi in data on the first track 1 taken in the system controller 75, and used for the production of the partial sequence at the mode designated from the key input section 76.

Now, a description will be given of a case where the partial reproduction of the impressive portion is executed by use of the above-mentioned reproducing apparatus. In this case, it is assumed that information related to a start point P$s$ and an end point P$e$ of the impressive portion in a tune of question is recorded on the track 1 of the video-CD as data of item No. 22 of the sequence item table for that tune.

Then, it is assumed that the item contents ID related to the point Ps are as follows:

[EH, EL, MH, ML, SH, SL, FH, FL]=[60, 39, 30, 31, 32, 32, 31, 30]

Also, it is assumed that the item contents ID related to the point P$e$ is as follows:

[EH, EL, MH, ML, SH, SL, FH, FL]=[60, 31, 30, 31, 35, 32, 31, 35]

The data of those points P$s$ and P$e$ are sequentially recorded in the data DI.

The information on the partial reproduction in the above example is that the impressive point is a designated tune (sequence), that is, starts from a position after 10 frames of 1 minute and 2 seconds are elapsed from the head of a track and ends at 15 frames of 1 minute and 5 seconds. It means that the start is performed by fading in the audio signal and the video signal, and the end is performed by fading out the audio signal and the video signal.

The user instructs the designation of a tune as well the mode of reproducing only the impressive portion through the key input section 76 in the reproducing apparatus shown in FIG. 25. In response thereto, the system controller 25 finds out the data segmented every 8 bytes related to the impressive point, referring to the high-order bits EH of the respective event data in data segmented every 8 bytes related to a plurality of partial sequences of the data DI of item No. 22 in the sequence item table of the tune designated. The system controller 25 then writes data each having 8 bytes related to those points P$s$ and P$e$ into a buffer memory.

Subsequently, the system controller 25 calculates a position to be accessed on the video-CD 61 from a relative time with respect to the head of a track f or the designated tune in accordance with data "M", "S" and "F" of the impressive point P$s$ of the initial 8 bytes. on the basis of the calculated result, the system controller 15 controls a tracking controller 63 so that the position of the pickup 62 is set to a reproduction position of question.

The above control is common to the above first and second reproducing methods, but, the subsequent control is different therebetween because they are different in the format of the video-CD.

First, a description will be given of the first reproducing method.

In the first reproducing method, the pickup 62 is jumped at a position 2 seconds before the position of an access point of question in view of time, and video sectors are sequentially picked up from that position of the video-CD so that the video sector thus picked up is decoded by the MPEG video decoder circuit 91. The MPEG video decoder circuit 91 detects an I-picture through the decoding process. Hence, the extension decoding of the moving picture data is carried out so that the output of the reproduced moving picture can be precisely obtained from the position of the I-picture. The decoding processing on the moving picture data is continuously carried out as it is.

During the above operation, the system controller 75 calculates a time elapsed for reproduction in accordance with sub-codes in data of the CD-ROM sector structure and the absolute time information in the header. Then, comparing the elapsed time with data "M", "S" and "F" related to the start point P$s$ of the impressive portion taken in the buffer memory, it is monitored that a position at which the video-CD is read out through the pickup reaches the start point P$s$ of the impressive portion.

Upon the arrival of the reading position due to the pickup at the start point P$s$, the decoding processing on the audio data is also started, and the system controller 75 controls the level control circuit 88 so as to make the reproduced audio signal outputted from the output terminal 89. Simultaneously, the system controller 75 controls the level control circuit 93, enabling the reproduced video signal of the moving picture to be outputted from the output terminal 95.

Then, the system controller 75 discriminates the operation at the time when the impressive portion starts to be reproduced in accordance with the low-order bits "EL" of the even data E in data related to the impressive point P$s$ of 8 bytes found out. In the first reproducing method, the level control circuits 88 and 93 are controlled so as to subject the audio signal as well as the video signal to a fade-in processing.

In this manner, in the first reproducing method, the reproduction of the Karaoke accompaniment music and the reproduction of the moving picture are simultaneously started.

Subsequently, a description will be given of the second reproducing method.

In the second reproducing method, the reproduction decoding of the audio data is started from the access point, and likewise as the above-described example, the system controller 75 executes the fade-in processing to thereby start the reproduction of the Karaoke accompaniment music.

On the other hand, in the moving picture data, the MPEG video decoder circuit 91 makes the video sector sequentially decoded in the same manner as the above, and an I-picture is detected through a decoding sequence, thereby precisely reproducing the moving picture. Then, upon the detection of the I-picture, the system controller 75 is allowed to be informed of the detection information. In response to that information, the system controller 75 controls the level control circuit 93 so that the reproduced video signal is supplied to the NTSC encoder circuit 94 to output the NTSC composite video signal through the output terminal 94 to the monitor unit.

In the second reproducing method, the moving picture is reproduced on the monitor unit late after the Karaoke accompaniment music is started. However, not only a precise moving picture is obtained, but also an interval from the access point to the position of the I-picture is after 2 seconds at the longest. Hence, the user does not feel so uncomfortable.

The processing on or before the end point of the impressive portion in the first reproducing method is identical to that in the second reproducing method.

In other words, upon the starting of the production of the audio and moving picture from the start point Ps of the impressive portion in the above-described manner, the system controller 75 calculates a time elapsed for reproduction in accordance with sub-codes in data of the CD-ROM sector structure as well as the absolute time information in the header. Then, comparing the elapsed time with data "M", "S" and "F" (the 11-th byte to the 16-th byte) related to the end point Ps of the impressive portion taken in the buffer memory, it is monitored that the reproduction position reaches the end point Pe of the impressive portion.

Upon the arrival of the reproduction position at the end point Pe, the system controller 75 discriminates the operation at the time of the completion of reproduction of the impressive portion in accordance with the low-order bits "EL" of the event data E related to the point Pe. In this reproducing method, the system controller 75 controls the level control circuits 88 and 93 to thereby subject the audio signal as well as the video signal to a fade-out processing.

With the above processing, the user can readily reproduce only the impressive potion of a desired tune by only instructing the designation of a tune as well as the mode of reproducing only the impressive portion.

(In the Case of New Video-CD Format)

Similarly in the new video-CD format, with the reproducing apparatus shown in FIG. 25, the partial sequence can be reproduced in the entirely same manner as that in the above-mentioned old video-CD format, by use of any one or some of item Nos. 22 to 31 in the sequence item table of the Karaoke basic information area on the track 1.

Moreover, in the new video-CD format, as described above, since the table of the entry point where the information on the position where the reproduction can be started (information on the position where the I-picture is recorded) is represented by time is recorded every sequence on the video-CD information area (time information of 98 points at the maximum per one track is sequentially recorded), the partial reproduction can be designated using the information on the entry point.

In other words, in this case, as information related to the partial reproduction which is recorded at the portion of item Nos. 23 to 31, the time information M, S and F is unnecessary, but only the event data E as the attribute of the respective entry points is recorded with the association of the event data E with the entry point. A variety of associating manners may be proposed. For example, the entry points and the event data E of the attribute of each point in the same order may be described as data DI of any one of item Nos. 22 to 31.

Alternatively, information on the designation of the entry point (for example, the designation of the point No.) in the entry table of a sequence of question may be paired with the event data E as the access point data of each partial sequence so that the start or end point of the entry points are associated with that of the partial sequence.

In the example of using information on the entry points, there are two methods one of which is a method of designating the entry point before the access point, and the other is a method of designating the entry point after the access point.

In the method of designating the entry point before the access point, the same processing as that of the first reproducing method in the format of the above-mentioned old video-CD is executed after the decoding processing on the moving picture data is started from the entry point of question.

In the method of designating the entry point after the access point, the reproduction decoding on the audio data is started from the access point in the same processing as that of the second reproducing method in the format of the above-mentioned old video-CD. Like the above example, the system controller 75 executes, for example, the fade-in processing so that the reproduction of the Karaoke accompaniment music is started. On the other hand, in the moving picture data, the position of the entry point designated is monitored in view of time in the same manner as that in the above example in the system controller 75. Upon the arrival of the reproduction position at the entry point of question, the decoding processing on the moving picture data and leading of the reproduced output are executed from that point so that it is outputted to the monitor unit. Thus, the reproduction of the moving picture is started from that point late after the reproduction of the audio data.

In the above method, the sort of the access point recorded on the video-CD is inputted from the key input section 76 thereby indicating the access point of question. There is a case where the access point is designated directly from the key input section 76 to start the reproduction from the access point thus designated. In such a case, in the same manner as the above example, the reproduction of the moving picture information can lead to the same operation and advantage as those in the above example by retrieving the position of the I-picture before or after that access point and executing the decoding and reproduction operation with a reference being the position of the I-picture.

In the above third embodiment, the information on the position of the access point in the partial sequence is time information from the head position of each track. However, the present invention is not limited thereto. For example, information on the absolute time on the disc or time information on the reproduced output information PTS may be used therefor.

The foregoing description of a preferred embodiment of the invention has been presented for purposes of illustration and description. It is not intended to be exhaustive or to limit the invention to the precise form disclosed, and modifications and variations are possible in light of the above teachings or may be acquired from practice of the invention. The embodiment was chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A recording medium, comprising:
   a program area in which a plurality of Karaoke audio programs and a plurality of respective Karaoke video programs are recorded; and
   a management area in which management data for use in managing said plurality of Karaoke audio programs and Karaoke video programs is recorded, said management area being located within at least a portion of not more than one track of said recording medium;

wherein each said Karaoke audio program includes at least one characteristic audio segment which may be used to identify the content of said Karaoke audio program, and wherein said management data includes an indication of the recording medium start position and the recording medium end position for at least one of said audio or video programs, and includes, for each said characteristic audio segment, an indication of the recording medium start position and the recording medium end position of said segment.

2. The recording medium according to claim 1, wherein said management data includes for each said characteristic segment an event data and a fade data.

3. The recording medium according to claim 1, wherein said program area has recorded therein an interlude audio segment, and further comprises an area located at the beginning of said interlude audio segment for recording beginning interlude segment information, and an area located at the end of said interlude audio segment for recording ending interlude segment information.

4. The recording medium according to claim 3, wherein said beginning interlude segment information and said ending interlude segment information each include an interlude event data and an interlude fade data.

5. The recording medium according to claim 1, wherein said program area has recorded therein a chorus audio segment, and said recording medium further comprises an area located at the beginning of said chorus audio segment for recording beginning chorus audio segment information, and an area located at the end of said chorus audio segment for recording ending chorus audio segment information.

6. The recording medium according to claim 5, wherein said beginning chorus audio segment information and said ending chorus audio segment information each include a chorus event data and a chorus fade data.

7. A method for reproducing a plurality of Karaoke audio programs, a plurality of respective Karaoke video programs, and management data from a recording medium, wherein said management data is located within at least a portion of not more than one track of said recording medium, wherein each said Karaoke audio program includes at least one characteristic audio segment which may be used to identify the content of said Karaoke audio program, and wherein said management data includes an indication of the recording medium start position and the recording medium end position for at least one of said audio or video programs, and includes, for each said characteristic audio segment, an indication of the recording medium start position and the recording medium end position of said segment, the method comprising the steps of:

detecting a user operation for requesting reproduction of one of said characteristic audio segments;

accessing said requested characteristic audio segment in accordance with the indication of said recording medium start position and said recording medium end position for said requested characteristic audio segment;

reproducing said requested characteristic audio segment as an audio signal; and reproducing the Karaoke video program corresponding to said requested characteristic audio segment for display to the user.

8. The method according to claim 7, wherein said characteristic audio segment includes a prelude portion.

9. The method according to claim 7, wherein said characteristic audio segment includes an interlude portion.

10. The method according to claim 7, wherein said characteristic audio segment includes a postlude portion.

11. The method according to claim 7, wherein said characteristic audio segment includes a chorus portion.

12. The method according to claim 7, wherein said step of reproducing the Karaoke video program corresponding to said requested characteristic audio segment comprises the steps of:

accessing an intra-coded picture located adjacent to said recording medium start position of said requested characteristic audio segment; and decoding video data temporally succeeding said intra-coded picture.

13. The method according to claim 7, wherein said step of reproducing said requested characteristic audio segment comprises audibly fading a reproduced characteristic audio segment.

14. The method according to claim 7, wherein said step of reproducing the Karaoke video program corresponding to said requested characteristic audio segment comprises visually fading a reproduced video program.

* * * * *